United States Patent [19]
Utenick et al.

[11] Patent Number: 5,258,695
[45] Date of Patent: Nov. 2, 1993

[54] SPIN MOTOR CONTROL SYSTEM FOR A HARD DISK ASSEMBLY

[75] Inventors: Michael R. Utenick, Englewood; John H. Blagaila, Boulder, both of Colo.

[73] Assignee: Integral Peripherals, Inc., Boulder, Colo.

[21] Appl. No.: 630,470

[22] Filed: Dec. 19, 1990

[51] Int. Cl.$^5$ .............................................. H02P 5/40
[52] U.S. Cl. ..................... 318/138; 318/439; 318/778; 360/48; 360/51
[58] Field of Search ............... 318/138, 254, 439, 778, 318/561, 560; 360/77.07, 50, 51, 48, 46, 40, 59

[56] References Cited

U.S. PATENT DOCUMENTS

| | | |
|---|---|---|
| 3,984,873 | 10/1976 | Pejcha . |
| 4,361,792 | 11/1982 | Davis, Jr. et al. ............. 318/729 |
| 4,488,187 | 12/1984 | Alaimo . |
| 4,492,903 | 1/1985 | Knight et al. ............. 318/138 |
| 4,518,904 | 5/1985 | MacLeod et al. . |
| 4,535,374 | 8/1985 | Anderson et al. . |
| 4,540,921 | 9/1985 | Boyd, Jr. et al. ............. 318/254 |
| 4,568,988 | 2/1986 | McGinlay et al. . |
| 4,630,190 | 12/1986 | Alaimo et al. . |
| 4,638,383 | 1/1987 | McGinlay et al. . |
| 4,737,867 | 4/1988 | Ishikawa et al. . |
| 4,748,385 | 5/1988 | Van Hout . |
| 4,750,059 | 6/1988 | Syracuse . |
| 4,780,866 | 10/1988 | Syracuse . |
| 4,783,705 | 11/1988 | Moon et al. . |
| 4,819,218 | 4/1989 | Barnard . |
| 4,825,321 | 4/1989 | Hassel et al. . |
| 4,858,034 | 8/1989 | Hassel et al. . |
| 4,864,437 | 9/1989 | Couse et al. . |
| 4,876,491 | 10/1989 | Squires et al. . |
| 4,894,734 | 1/1990 | Fischler et al. . |
| 4,933,785 | 6/1990 | Morehouse et al. . |
| 4,979,055 | 12/1990 | Squires et al. . |
| 4,979,056 | 12/1990 | Squires et al. . |
| 4,987,355 | 1/1991 | Leaper et al. . |
| 5,001,578 | 5/1991 | Yamauchi . |
| 5,016,124 | 5/1991 | Fukushima et al. . |
| 5,047,876 | 9/1991 | Genheimer et al. . |
| 5,050,013 | 9/1991 | Holsinger . |
| 5,050,014 | 9/1991 | Maeda et al. . |
| 5,050,016 | 9/1991 | Squires et al. . |

FOREIGN PATENT DOCUMENTS

| | | |
|---|---|---|
| WO91/02354 | 2/1991 | PCT Int'l Appl. . |
| WO91/06094 | 5/1991 | PCT Int'l Appl. . |
| WO91/06096 | 5/1991 | PCT Int'l Appl. . |
| 2684359 | 4/1982 | United Kingdom ............. 323/205 |

OTHER PUBLICATIONS

"Quantum Low Power Products: Go Drive 2½-inch Hard Disk Drives—ProDrive Gem Series 3½-inch Small Frame Devices—Technical Highlights", Sep. 1990.

Primary Examiner—William M. Shoop, Jr.
Assistant Examiner—John W. Cabeca
Attorney, Agent, or Firm—Skjerven, Morrill, MacPherson, Franklin & Friel

[57] ABSTRACT

A spin motor control system includes a BEMF commutation circuit, a startup circuit and a monitor circuit, each of which operate utilizing digital techniques. The BEMF commutation circuit includes first and second counters that are programmable to accommodate for changing system parameters. The BEMF commutation circuit does not require the incorporation of an external capacitor, is insensitive to leakage current, and provides stable timing characteristics. The startup circuit also includes a counter and is programmable to accommodate for changing system parameters. The startup circuit does not require an external capacitor and provides stable generation of the startup pulses. The monitor circuit includes first and second counters for blanking the BEMF circuitry after commutation. The monitor circuit further includes circuitry for detecting and correcting the direction of rotation of the spin motor. The monitor circuit provides a microprocessor interface to allow for changing motor parameters and environmental conditions, eliminates the requirement of a capacitor, and provides stable timing characteristics.

15 Claims, 20 Drawing Sheets

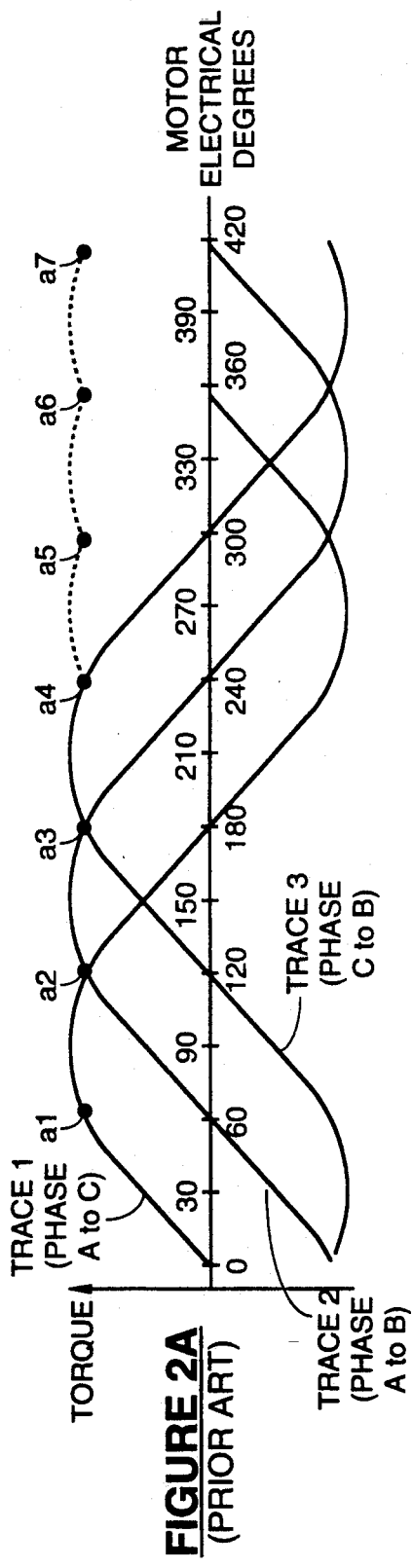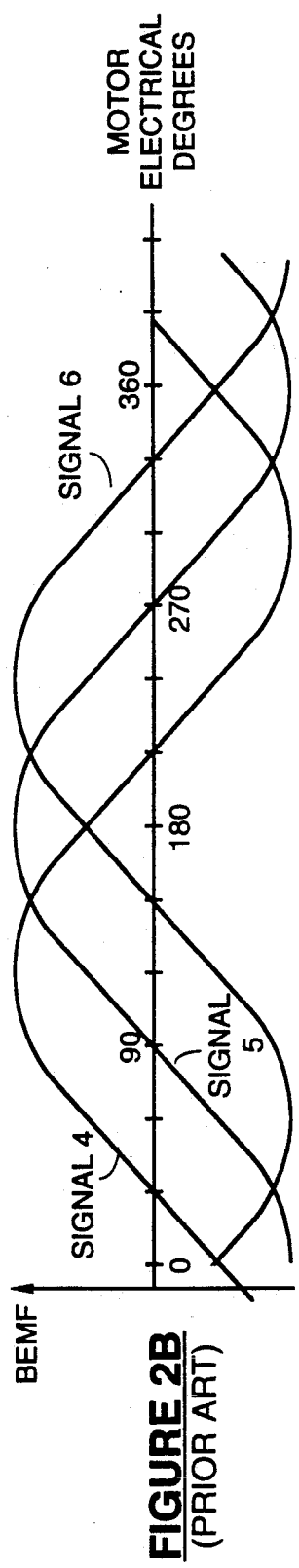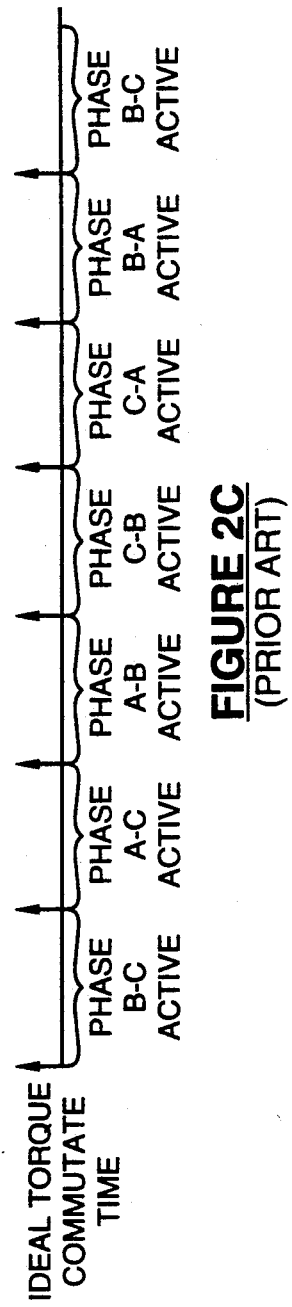
FIGURE 2A (PRIOR ART)
FIGURE 2B (PRIOR ART)
FIGURE 2C (PRIOR ART)

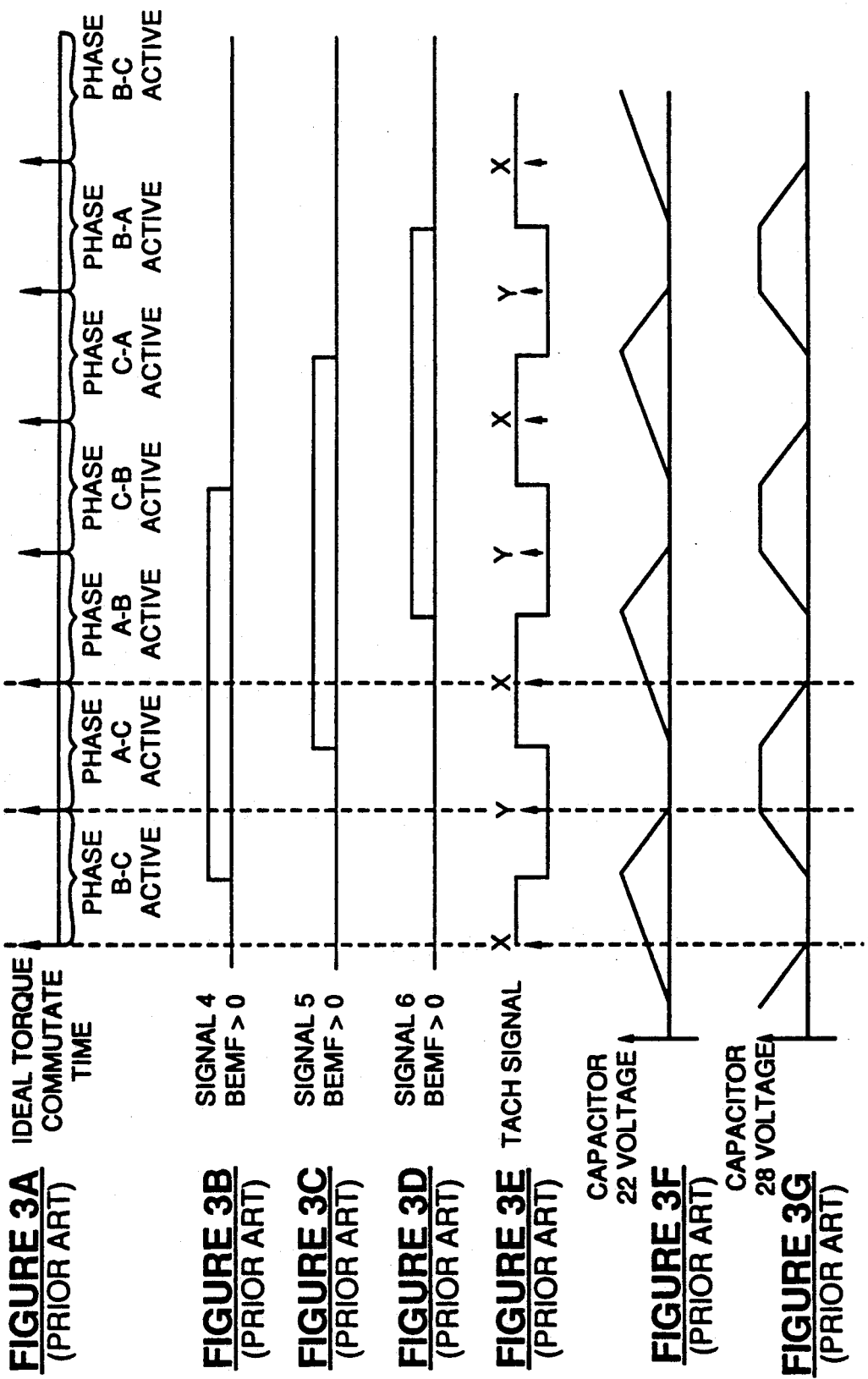

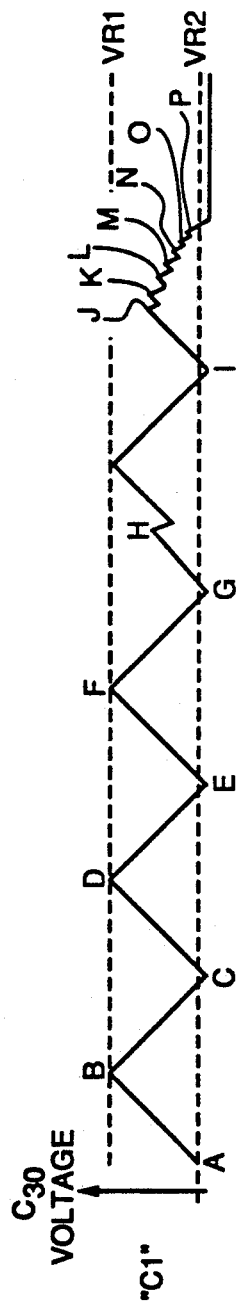
FIGURE 6A (PRIOR ART)
FIGURE 6B (PRIOR ART)
FIGURE 6C (PRIOR ART)

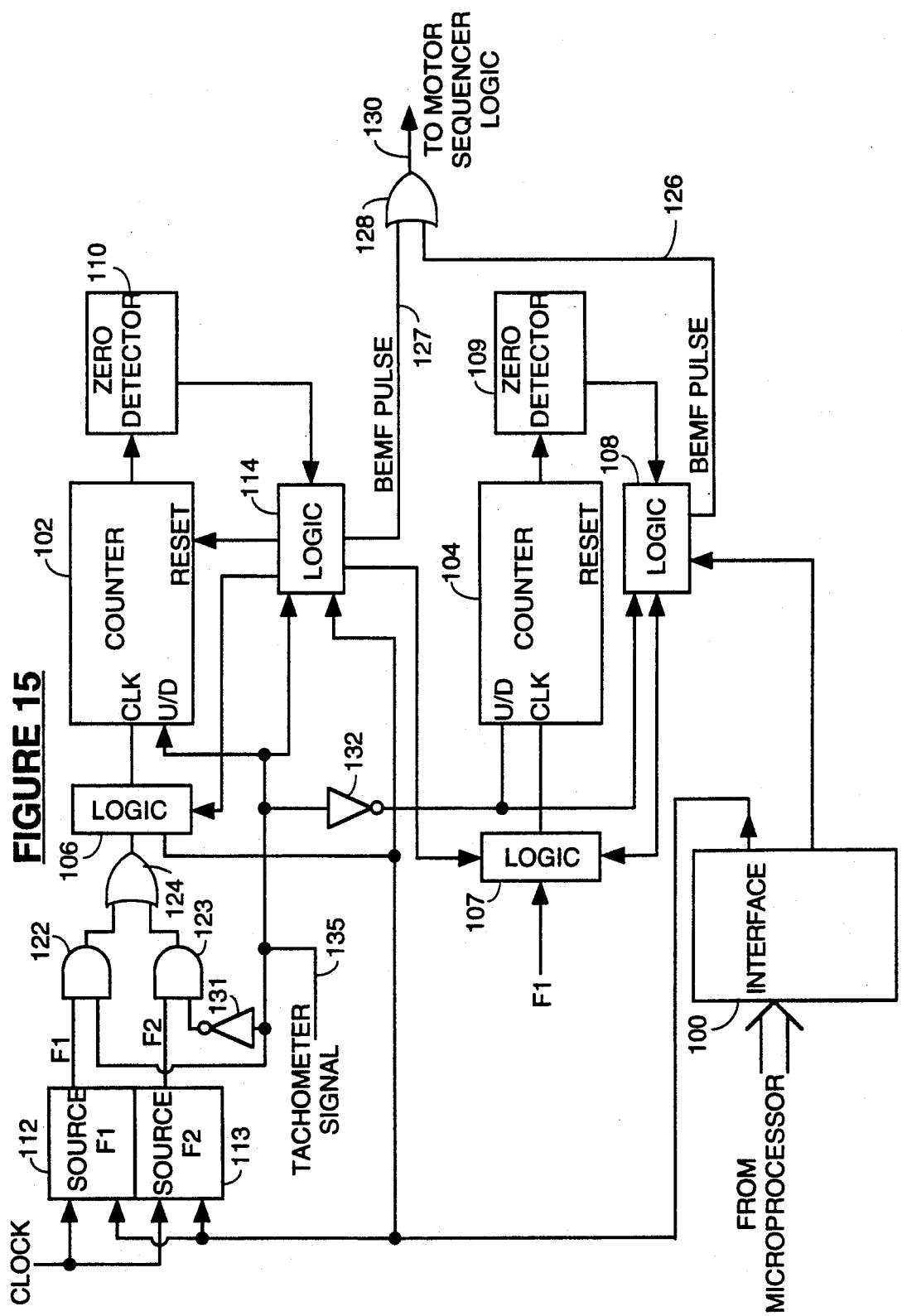

FIGURE 16A TACHOMETER 
FIGURE 16B COUNTER 102 # OF CNTS 
FIGURE 16C COUNTER 104 # OF CNTS 

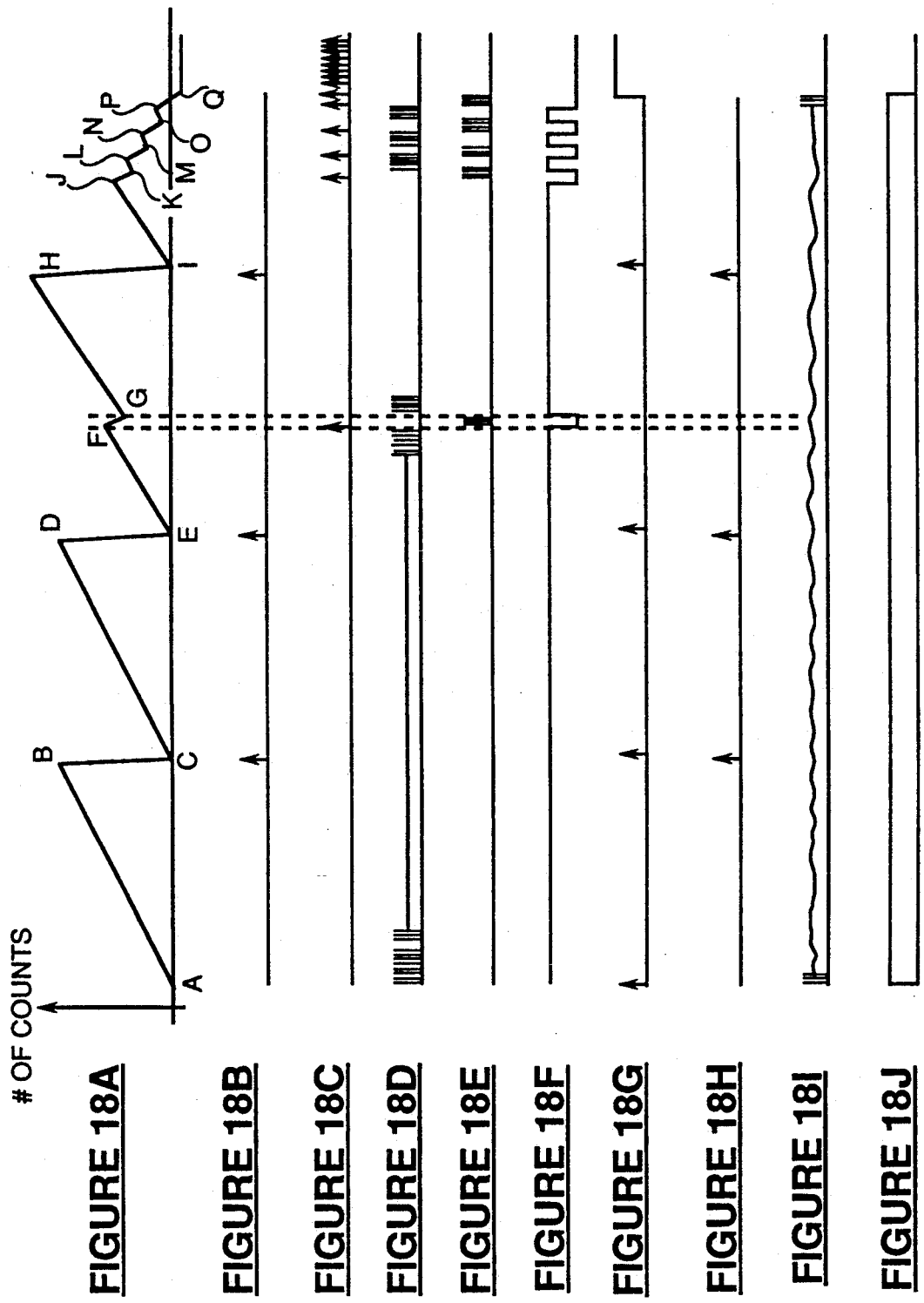

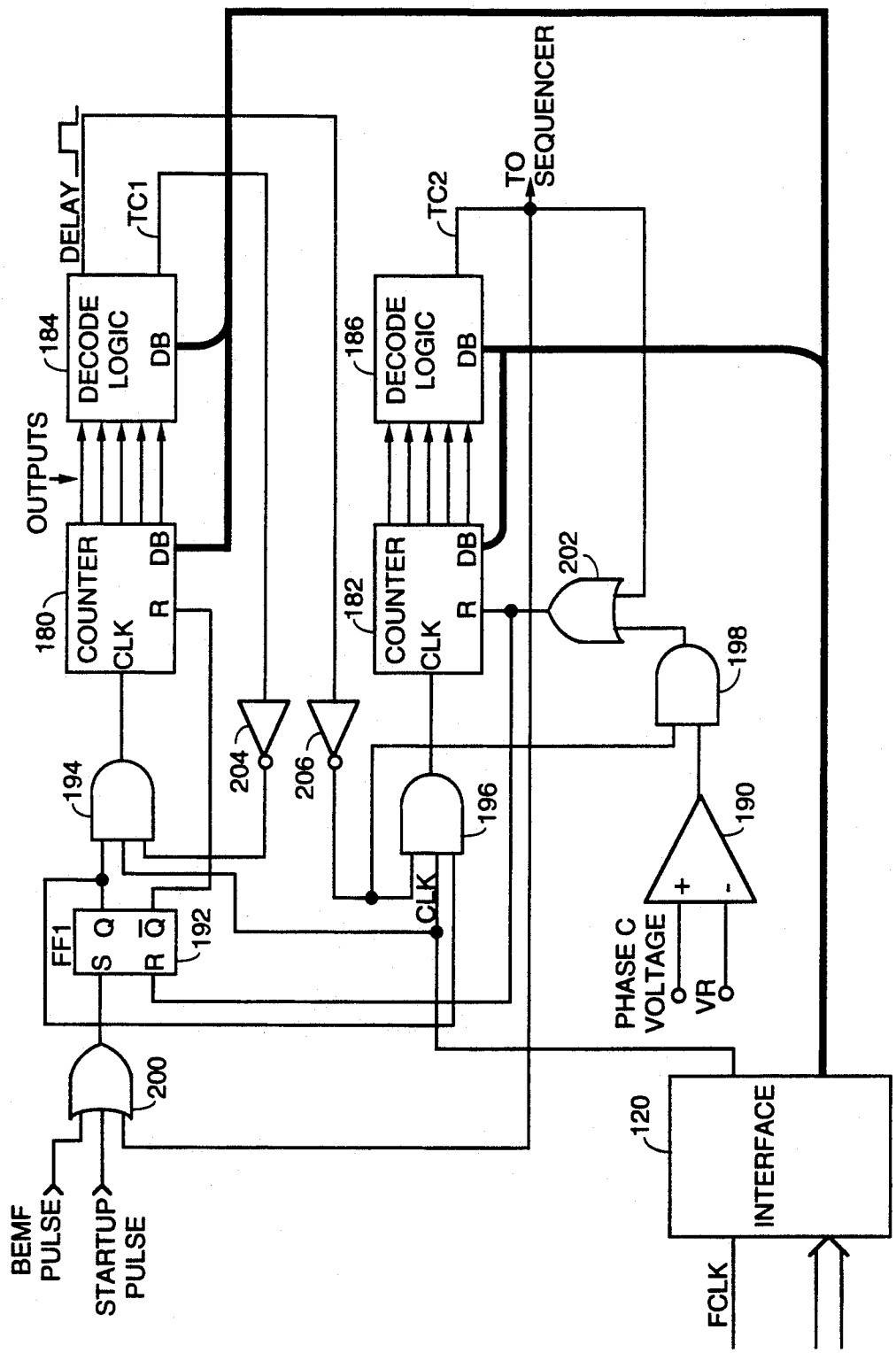

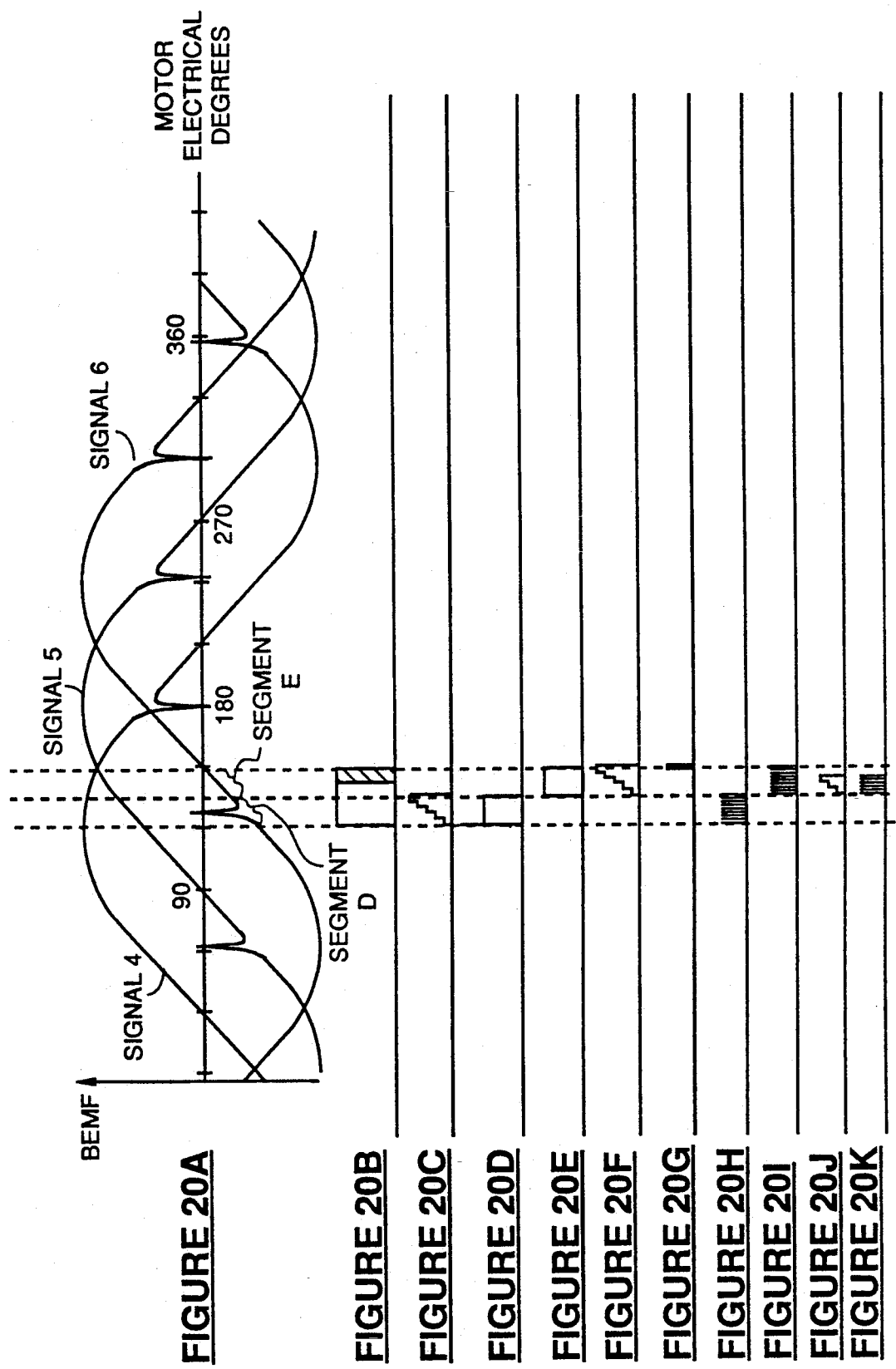

SPIN MOTOR CONTROL SYSTEM FOR A HARD DISK ASSEMBLY

BACKGROUND OF THE INVENTION

1. Field of the Invention

The present invention relates to motor control systems, and more particularly to a spin motor control system for disk drive apparatus.

2. Description of the Relevant Art

Magnetic disk storage systems such as hard disk drive systems and floppy disk drive systems have been and continue to be the predominant mechanisms for providing large volumes of relatively low-cost computer accessible memory or storage. A typical hard disk drive system includes a number of adjacently positioned disks coated with an appropriate magnetic material that are mounted for rotation on a common spindle. The typical system further includes a set of transducer heads carried in pairs on elongated supports for insertion between adjacent disks wherein the heads of each pair face in opposite directions to engage opposite surfaces of the adjacent disks. The transducer heads transform magnetic variations into electric variations when reading data stored on the disks, and transform electric variations to magnetic variations when writing data to be stored on the disks. The support structure is coupled to a positioner motor that typically includes a coil mounted within a magnetic field for linear movement and is typically oriented relative to the disks to move the heads radially over the disk surfaces to thereby enable the heads to be positioned over any annular track on the surfaces. During normal operation, the positioner motor, in response to control signals from a host computer, positions the transducer heads radially for recording data signals on, or retrieving data signals from, a pre-selected one of a set of concentric storage tracks on the disks.

A typical hard disk drive system also includes a spin motor operatively connected to the spindle for rotating the magnetic disks during data read and data write operations. An electronic control and driving circuit is coupled between the spin motor and the host microprocessor interface to provide drive signals to the motor windings to thereby control the speed and other operating parameters of the spin motor, as well as to control initial start-up of the spin motor.

FIG. 1 is a schematic view of a portion of a three-phase brushless spin motor 10 connected to associated control and drive circuitry. For the particular example illustrated herein, spin motor 10 is a twelve pole motor having nine windings. The nine windings are grouped into three sets, wherein each winding set is selectively driven at a predetermined phase and is represented by one of phase windings 12, 14, 16. As known to those skilled in the art, a sequencer 18 and a motor amplifier 20 collectively operate to selectively drive the phase windings 12, 14, 16 in a manner as explained below to thereby induce rotation of the rotor shaft of motor 10.

Referring next to FIG. 2A in conjunction with FIG. 1, traces 1, 2, and 3 illustrate the motor torque generated when a constant current flows through selected pair combinations of phase windings 12, 14, 16 with respect to motor electrical degrees. Trace 1 shows the motor torque curve with respect to electrical degrees when transistors 20a and 20f are turned on (20b-20e turned off), resulting in the flow of current from phase A winding 12 to phase C winding 16. Similarly, trace 2 shows the motor torque curve on the common horizontal axis when transistors 20a and 20d are turned on, resulting in the flow of current from phase A winding 12 to phase B winding 14. Finally, trace 3 shows the motor torque curve when transistors 20d and 20e are turned on, resulting in the flow of current from phase C winding 16 to phase B winding 14. The extremum torque points occur 60 electrical degrees apart. For a twelve pole motor, 360 electrical degrees correspond equivalently to 1/6 of a mechanical revolution of the rotor.

To spin the rotor in one continuous direction, the motor torque must be either continuously positive or continuously negative. A continuously positive motor torque, for example, can be provided by designing and controlling sequencer 18 to turn on selected pairs of the transistors 20a-20f in a predetermined and precisely timed sequence to thus result in an overall torque curve as defined along the extremum segments connecting a1-a7. It should be noted that the curve connecting segments a4-a7 results from the flow of current in a reverse direction through the respective phase winding pairs. The overall torque curve defined along the segments a1-a7 results in maximum torque with the least ripple, and thus is considered the result of optimal commutation timing. The predetermined sequence required for turning on the transistors 20a-20f as controlled by sequencer 18 is as follows:

Sequence 1: Transistors 20a and 20f turned on—Current flows from phase A winding 12 to phase C winding 16—Generates torque segment a1 to a2;

Sequence 2: Transistors 20a and 20d turned on—Current flows from phase A winding 12 to phase B winding 14—Generates torque segment a2 to a3;

Sequence 3: Transistors 20d and 20e turned on—Current flows from phase C winding 16 to phase B winding 14—Generates torque segment a3—a4;

Sequence 4: Transistors 20b and 20e turned on— Current flows from phase C winding 16 to phase A winding 12—Generates torque segment a4—a5;

Sequence 5: Transistors 20b and 20c turned on—Current flows from phase B winding 14 to phase A winding 12—Generates torque segment a5—a6;
and Sequence 6: Transistors 20c and 20f turned on—Current flows from phase B winding 14 to phase C winding 16—Generates torque segment a6—a7.

The control system for triggering the sequencer 18 typically includes a circuit for generating triggering pulses while the motor is spinning, a startup circuit for generating triggering pulses to initially spinup the motor from a stalled condition, and a monitor circuit for detecting and correcting the direction of rotation and for providing a "blanking" signal as will become evident when the following description is fully appreciated. Each of these circuits is considered separately below.

In early hard disk drive systems, the commutation timing of the brushless motor as it was spinning was controlled using Hall Effect sensors which were placed within the motor. As disk drives shrunk in size (3½ and 2½ inch form factors), space became extremely limited and thus the Hall sensors were removed from the spin motor to decrease its size.

In accordance, another method was developed to determine the optimal timing required for triggering the sequencer circuit to thus commutate the spin motor. This method involves the phenomenon of back electromotive force (BEMF). The BEMF signals generated for a three phase motor when measured with respect to the center tap are shown as signals 4, 5 and 6 in FIG. 2B. It is evident that the BEMF signals cross the zero voltage axis when the motor torques are at their extremum values. To provide the least amount of torque ripple, the motor is commutated at 30 electrical degrees before and after the extremum torque points. These ideal motor commutation times are shown both in FIG. 2C and in FIG. 3A.

Analog comparators are connected across each phase winding 12, 14, 16 of the motor to determine when each of the BEMF signals is greater than zero. The output signals generated by these comparators are shown in FIGS. 3B-3D. The comparator signals of FIGS. 3B-3D are logically decoded to generate the tachometer signal as shown in FIG. 3E. Such generation of the tachometer signal is known to those skilled in the art. It is noted that the optimal motor commutation times are shown to occur at the midpoint of each high and low state of the tachometer signal as represented at points X and Y, respectively.

The midpoints X and Y of each high and low state of the tachometer signal are determined in accordance with the circuits of FIGS. 4A and 4B. The voltage waveforms generated across the capacitors 22 and 28 of the circuits are shown in FIGS. 3F and 3G, respectively. To generate the waveform of FIG. 3F, capacitor 22 is charged with a constant current source 24 during the high period of the tachometer signal and is then discharged at twice the rate with a constant current sink 26 where the tachometer signal changes states. When the spin motor is running at nominal speed, the capacitor 22 reaches its lowest level at point Y which is the desired time to commutate the motor. Capacitor 22 is combined with additional sensing and triggering circuitry connected to the sequencer 18 to thereby commutate the motor amplifier 20 to the next phase.

The capacitor 28 of FIG. 4B is provided to determine the commutation points labeled X. This is accomplished by charging the capacitor 28 with a constant current source 27 during the time at which capacitor 22 is being discharged, and then holding the voltage charged until the tachometer signal changes to a high state. At this time, the capacitor 28 is discharged with constant current sink 29 that has the same magnitude as but the opposite polarity of current source 27. When the capacitor 28 reaches its minimum voltage level, sensing and triggering circuitry connected thereto senses the minimum voltage condition and thereby causes sequencer 18 and thus the motor amplifier 20 to toggle to the next phase state of the sequence.

The above-described BEMF technique for determining commutation timing works well in that when the spin motor is first starting up, the commutation points are not fixed in time. If the values of capacitors 22 and 28 are chosen correctly, the method can be used to commutate the motor even during the initial spinup of the motor. During the initial spinup of the motor, the frequency of the tachometer signal varies. The upper charge levels of capacitors 22 and 28 is not critical, and thus if the period is longer, the capacitors 22 and 28 will simply charge to a higher level. When the tachometer signal changes states due to a zero-crossing of the BEMF signal, the respective capacitor 22, 28 will be discharged. When the lowest voltage level or some other predetermined voltage threshold level is reached, the sensing and triggering electronics sequences the motor to the next commutation state.

Although the technique is seemingly ideal in principle, several disadvantages are associated therewith. Firstly, several factors associated with current sources 24, 27 and with the current sinks 26, 29 are critical. Current sources 24, 27 and current sinks 26, 29 must be well matched. If they are not precisely matched, the commutation points are incorrectly determined.

In addition, the absolute values of the current sources 24, 27 and sinks 26, 29 must be well controlled from one spindle driver integrated circuit chip to another. If the absolute values are not well matched, the dynamic range of speed control becomes inconsistent from one unit to the next.

Furthermore, since the current sources 24, 27 and sinks 26, 29 are usually in the low microamp range, they are subject to various leakage paths on a printed circuit board. This problem can effect the time constant of the respective capacitor 22, 28 being charged and discharged and thus can cause the motor to be commutated at a non-optimal time.

Several factors associated with capacitors 22, 28 are also critical. Capacitors 22, 28 may change in capacitance value due to temperature and humidity conditions. This can also be detrimental to the dynamic operating range of the speed control system.

In addition, the type of dielectric used for the capacitors 22, 28 must be considered. Material such as X7R exhibits a piezoelectric effect which causes a noise pulse at the end of the respective capacitor 22, 28 discharge cycle which can cause the sensing electronics to cause commutation of the motor to the next phase at the wrong time.

Furthermore, the values of capacitors 22, 28 must be relatively large, and thus it becomes impractical to place them within the spindle driver integrated circuit chip.

Finally, if the timing requirements for commutation of a particular system must be modified, the capacitors 22, 28 must typically be changed which therefore involves rework of the printed circuit board.

The above description considers the commutation of the spin motor phase windings 12, 14, 16 during normal operation when the motor is spinning. The commutation of the phase windings 12, 14, 16 is next considered at initial operation when the spin motor is started from a stalled condition. When the motor is stalled, there is no generated BEMF signal, and the motor must be spinning at a certain speed in order to generate an adequate BEMF signal to drive the above described sensing electronics to control commutation.

Thus, from a stalled condition, the motor is typically treated as a step motor and is thereby caused to rotate at a constant speed. This speed is determined by the parameters of inertia, torque constant, number of poles, and current applied.

One known implementation for spinning up the spin motor involves the use of a capacitor 30, a current source 32, a pair of current sinks 34, 36, an electronic switch 38, comparators 40, 42, and a pair of oneshot circuits 44, 46 as illustrated in the schematic of FIG. 5. Other components described earlier are also included in the schematic and are numbered similarly. Referring to the schematic in conjunction with the waveforms of FIGS. 6A-6C, during initial spinup when the motor is spinning too slowly to generate a sufficient BEMF signal, switch 38 is in position 1 and capacitor 30 is thereby charged by current source 32. The voltage charged across capacitor 30 is shown as segment A-B in FIG. 6A. When the voltage across capacitor 30 reaches the reference voltage VR1, comparator 40 provides a control signal to a control logic circuit 48 that responsively causes switch 38 to move to a position 2. When switch 38 is moved to position 2, current sink 34 is connected to discharge capacitor 30 until a voltage equal to voltage reference VR2 is reached. When comparator 42 senses a voltage less than reference voltage VR2, the control logic toggles switch 38 back to position 1. The capacitor 30 voltage thereafter starts to charge again along the segment C-D. Comparator 42 also generates a positive pulse (when the voltage across capacitor 30 exceeds reference voltage VR2). The pulse is received at oneshot circuit 44 which responsively generates a commutation triggering pulse to the sequencer 18. The sequencer 18 controls the phases of the motor amplifier that are active. This process repeats until the motor gains sufficient speed to start generating the BEMF signal.

When point H is reached, a BEMF commutation pulse is generated. This pulse triggers oneshot circuit 46 which thereby causes the control logic 48 to toggle switch 38 to position 3. Capacitor 30 discharges for a given period of time, as shown following point H. This discharge time is determined by control logic 48. As the number of BEMF pulses generated increases, the voltage across capacitor 30 is repetitively discharged by current sink 36 and is discharged below voltage reference VR2. When this occurs, the output signals from the two comparators 40, 42 remain low without transitions and thus the sequencer 18 no longer triggered by oneshot circuit 44. The sequencer 18 is thereafter triggered solely by the BEMF pulse through oneshot circuit 46.

FIG. 6B illustrates the commutation pulses generated by the startup oscillator oneshot circuit 44 and FIG. 6C illustrates the commutation pulses generated by the BEMF oneshot circuit 46. The faster the motor rotates, the more numerous the BEMF pulses. These rapidly occurring BEMF pulses result in the voltage across capacitor 30 to be discharged below VR2 and thus disables the startup oscillator.

Several disadvantages are associated with this type of startup oscillator. The value of capacitor 30 must be changed if the system parameters are changed. In addition, capacitor 30 is an external part to the spindle driver chip and thus requires valuable room in small form factor disk drives. Finally, current leakage from the capacitor 30 to ground can effect the startup commutation frequency. This can cause the spin motor to fail to reach nominal speed in the allotted time. Small drives typically require a fast spinup time characteristic, and hence if the startup capacitor 30 has excessive leakage, the drive will fail the requirement.

Another method used to start motors involves a variable-time timing circuit used to step the sequencer. The time characteristics for the timer is based upon the motor and the load parameters. This technique must be very conservative since it is configured in an open loop orientation. If the timing characteristics are too aggressive, the motor will fail to spinup. With conservative timing characteristics, the motor spinup time is relatively long which is a drawback for use in small disk drives. The conservative timing characteristics are in part required to accommodate changes in load, motor parameters and environmental conditions.

Another important aspect to be considered in the design of a spin motor and the associated control circuitry involves a monitor circuit. The monitor circuit for a brushless DC (BDC) motor serves two functions. The first function is to degate or blankout momentarily the BEMF commutation circuitry whenever a motor phase winding is turned off. Referring to the schematic of FIG. 7 and the associated waveforms of FIGS. 8A-8C, consider first a current flowing from phase A winding 12 to phase C winding 16. This current causes the rotor to rotate from point a1 to point a2. When point a2 is reached, the sequencer 18 commutates the motor 10 such that current flows from phase A winding 12 to phase B winding 14. Phase C winding 16 is the phase winding that is now used to measure the BEMF signal since it is the turned-off winding. However, before the BEMF signal can be monitored, the residual current in the winding 16 due to the prior phase must be allowed to discharge through a diode 60 to a storage capacitor 62. The time required to discharge the phase winding is referred to as blanking time, diode flyback, or reverse recovery time. The BEMF signals generated by each phase winding are shown in FIG. 8B. The noise "glitches" shown in each BEMF signal 4-6 result from the residual current discharge explained above and cause the signals to cross through the zero voltage level, for example, at points W and Z. FIGS. 9B, 9C, and 9D are waveforms of the BEMF comparator output signals for each phase winding and indicate when each phase winding has a positive BEMF signal. The noise glitches of the BEMF signals 4-6 cause corresponding glitches (labelled as points N on the traces) in the comparator output signals which thus interfere with the generated tachometer signal. For this reason, a delay time shown as segment D is required following a commutation triggering pulse before the BEMF signal is processed. Thus, the first task of the monitor circuit is to provide the delay after a commutation pulse.

The second function of the monitor circuit is to detect if the motor is rotating in the proper direction. Referring back to FIGS. 8A and 8B, if phase A to C is energized at point a1 and the motor is rotated to point a2, the BEMF signal 6 of phase C winding 16 should have a negative polarity (segment E) immediately following the commutation trigger pulse and delay time (segment D) described above. If the signal has a positive polarity, the motor is spinning in the wrong direction, and therefore the motor should be commutated to the next phase. This allows the motor to catch up and start generating torque of the proper polarity.

The two functions of the monitor circuit have traditionally been accomplished using current sources and comparators. FIG. 10 shows a schematic of a monitor circuit for providing a blanking delay and for providing false BEMF detection and direction correction, and FIGS. 11A-11E show the waveforms generated. One of three actions trigger the circuit: a BEMF commutation pulse provided at line 80, a startup oscillator commutation pulse provided at line 81, or the internally generated monitor false polarity correction pulse provided at line 82. A trigger pulse received at any of lines 80, 81, 82 is provided to control block 84 through OR gate 85. When a trigger pulse is received, control block 84 causes switch 86 to close and thereby causes charging of capacitor 87 with current source 83. In addition, control block 84 causes flip-flop 88 to set to a high state. The time period from the occurrence of the trigger pulse until capacitor 87 charges to voltage reference VR3 is the delay time (segment D) as shown in FIGS. 11A and 11B. When the delay pulse of FIG. 11B is high, the BEMF comparators are degated and are thus not allowed to change states. When the voltage across capacitor 87 reaches voltage reference VR3, comparator 93 enables AND gate 89. Comparator 90 monitors (at line 99) whether the polarity of the BEMF signal from phase C winding 16 is negative while AND gate 89 is active (during the time period when the pulse as shown in the waveform of FIG. 11C is high). If the BEMF is negative, OR gate 91 provides a signal to control block 94 which thereby causes capacitor 87 to be discharged by closing switch 95 (FIG. 11D). OR gate 91 also provides a signal that causes flip-flop 88 to be reset to a low state.

If the BEMF signal from phase C winding 16 is positive, then the output of AND gate 89 remains inactive. Capacitor 87 thus charges to voltage reference VR4 at point F (FIG. 11E) and thereby generates a false polarity commutation pulse as shown in FIG. 11F by means of comparator 96. The false polarity commutation FPC pulse signal is received at control block 94 through OR gate 91 that accordingly discharges capacitor 87. The FPC pulse signal is also received at control block 84 through OR gate 85 such that when capacitor 87 has been discharged, it will be recharged by current source 83 and the process repeated. The FPC pulse signal is finally provided to the sequencer so that the motor is commutated to the next state.

The blanking and direction control circuit described above has disadvantages in that an external capacitor 87 is required. In addition, the circuit does not optimally accommodate for changing motor parameters and environmental conditions.

Numerous other magnetic disk storage systems and components thereof relating particularly to spin motor control have been disclosed. Of general interest in the field of spin motor control are U.S. Pat. No. 4,933,785 to Morehouse et al., issued Jun. 12, 1990; U.S. Pat. No. 4,568,988 to McGinlay et al., issued Feb. 4, 1986; U.S. Pat. No. 4,638,383 to McGinlay et al., issued Jan. 20, 1987; U.S. Pat. No. 4,371,903 to Lewis, issued Feb. 1, 1983; U.S. Pat. No. 4,737,867 to Ishikawa et al., issued Apr. 12, 1988; and the publication "Quantum Low Power Products: Go Drive-2½-inch Hard Disk Drives--ProDrive Gem Series-3½-inch Small Frame Devices--Technical Highlights", September 1990.

SUMMARY OF THE INVENTION

A spin motor control system according to the present invention includes a BEMF commutation circuit, a startup circuit, and a monitor circuit, each of which operate without the above-described disadvantages. The BEMF commutation circuit of the present invention is programmable to accommodate for changing system parameters and does not require the incorporation of an external capacitor. In addition, the BEMF commutation circuit is insensitive to leakage currents and has stable timing characteristics. The startup circuit of the present invention is also programmable to accommodate for changing system parameters, does not require an external capacitor, and provides stable generation of the startup pulses. Finally, the monitor circuit of the present invention is programmable, does not require an external capacitor, and provides stable timing characteristics.

These and other advantages are provided with the present invention, in accordance with which a control circuit for a spin motor comprises a back EMF sensing circuit connectable to at least one winding of the spin motor for providing a first signal derived from the back EMF induced in said winding. In addition, a first counter is coupled to the back EMF sensing circuit.

The control circuit may further include a second counter coupled to the back EMF circuit, and first and second zero detectors coupled to the first and second counters, respectively.

In accordance with another aspect of the invention, a startup control circuit for a spin motor comprises a counter for counting in a predetermined startup sequence when the spin motor is stalled and further comprises a startup pulse generating means coupled to the counter for generating a startup pulse depending upon a predetermined condition of the counter. In addition, the startup control circuit comprises a BEMF processing means coupled to the counter for causing the counter to count in a sequence other than the predetermined startup counting sequence when a BEMF commutation pulse is received.

In accordance with a final aspect of the invention, a monitor circuit for a spinup motor comprises a first counter for controlling a delay period signal for blanking a BEMF pulse and means for receiving a BEMF signal coupled to the first counter. The monitor circuit further comprises means coupled to the first counter for providing the pulse to an output terminal depending upon the delay period signal.

The invention will be more readily understood by reference to the drawings and the detailed description. As will be appreciated by one skilled in the art, the invention is applicable to motor control systems in general, and is not limited to the specific embodiment disclosed.

BRIEF DESCRIPTION OF THE DRAWINGS

FIG. 2A is a set of traces illustrating motor torque with respect to motor electrical degrees.

FIG. 2B is a set of waveforms illustrating the BEMF signals in each phase winding of a spin motor with respect to motor electrical degrees.

FIGS. 2C and 3A are timing diagrams illustrating the ideal commutation times and active phase windings with respect to motor electrical degrees.

FIGS. 3B-3D are a set of waveforms illustrating output signals from BEMF signal comparators.

FIG. 3E is a waveform of a tachometer signal.

FIGS. 3F and 3G are waveforms illustrating the voltage levels across a set of capacitors.

FIGS. 6A-6C are a set of waveforms associated with the circuit of FIG. 5.

FIG. 15 is a block diagram of a BEMF commutation control circuit in accordance with the invention.

FIG. 16A is a waveform illustrating a tachometer signal.

FIGS. 16B and 16C are graphs illustrating the value of counters within the BEMF commutation control circuit.

FIGS. 18A-18J are a set of waveform illustrating operation of the start-up circuit.

FIG. 19 is a block diagram of a monitor circuit in accordance with the invention.

FIGS. 20A-20K are a set of waveforms illustrating operation of the monitor circuit.

DETAILED DESCRIPTION OF THE INVENTION

The following includes a detailed description of the best presently contemplated mode for carrying out the invention. The description is intended to be merely illustrative of the invention and should not be taken in a limiting sense.

Figure 1:
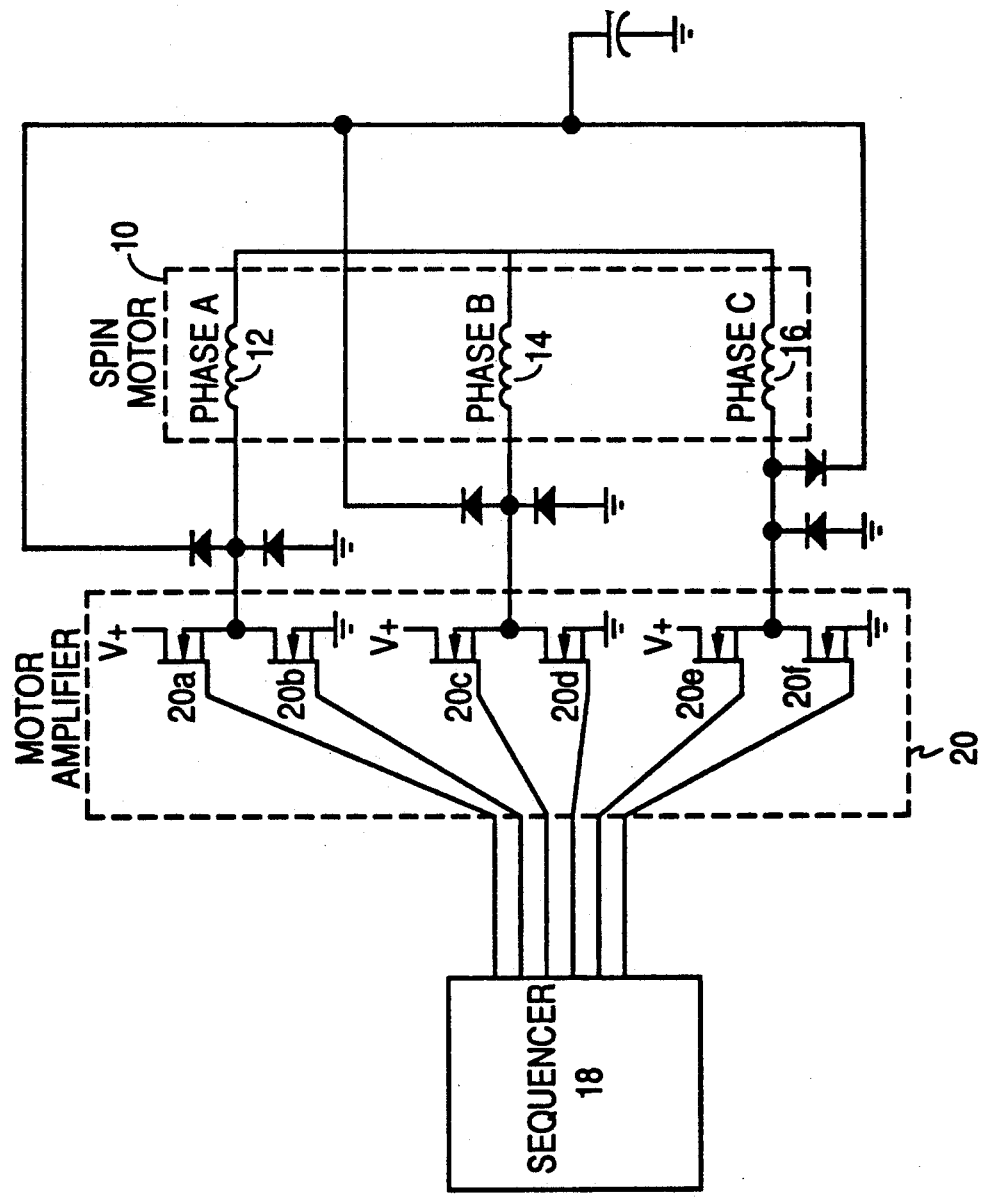
FIG. 1 is a schematic diagram of a spin motor commutation sequencing circuit.
Figure 4B:
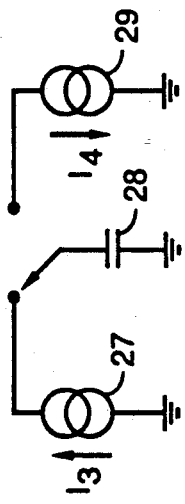
FIGS. 4A and 4B are schematic diagrams of circuits for determining optimal commutation times.
Figure 4A:
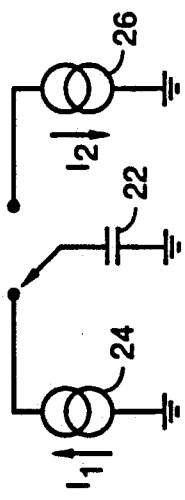
Figure 5:
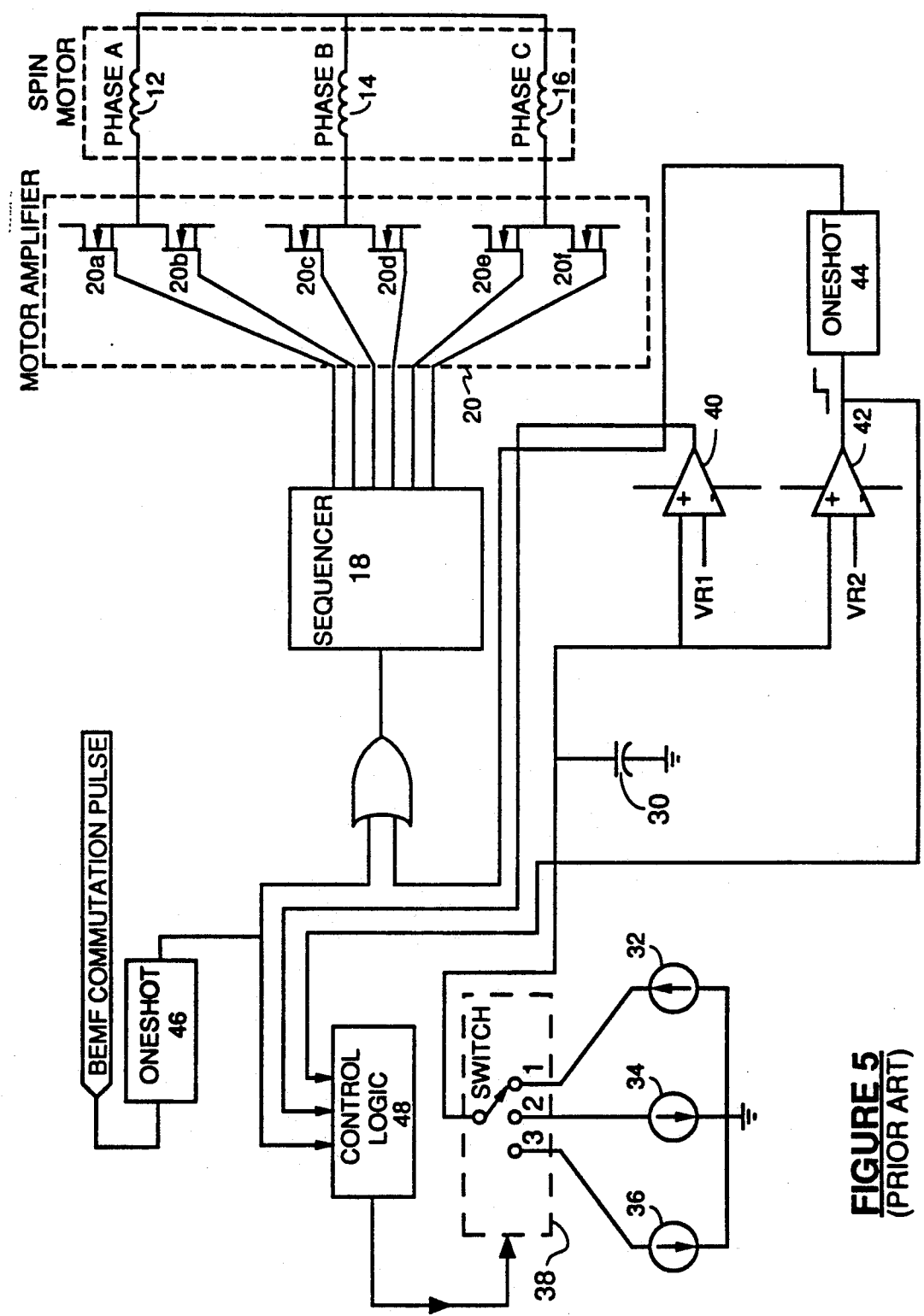
FIG. 5 is a block diagram of a spinup oscillator circuit.
Figure 7:
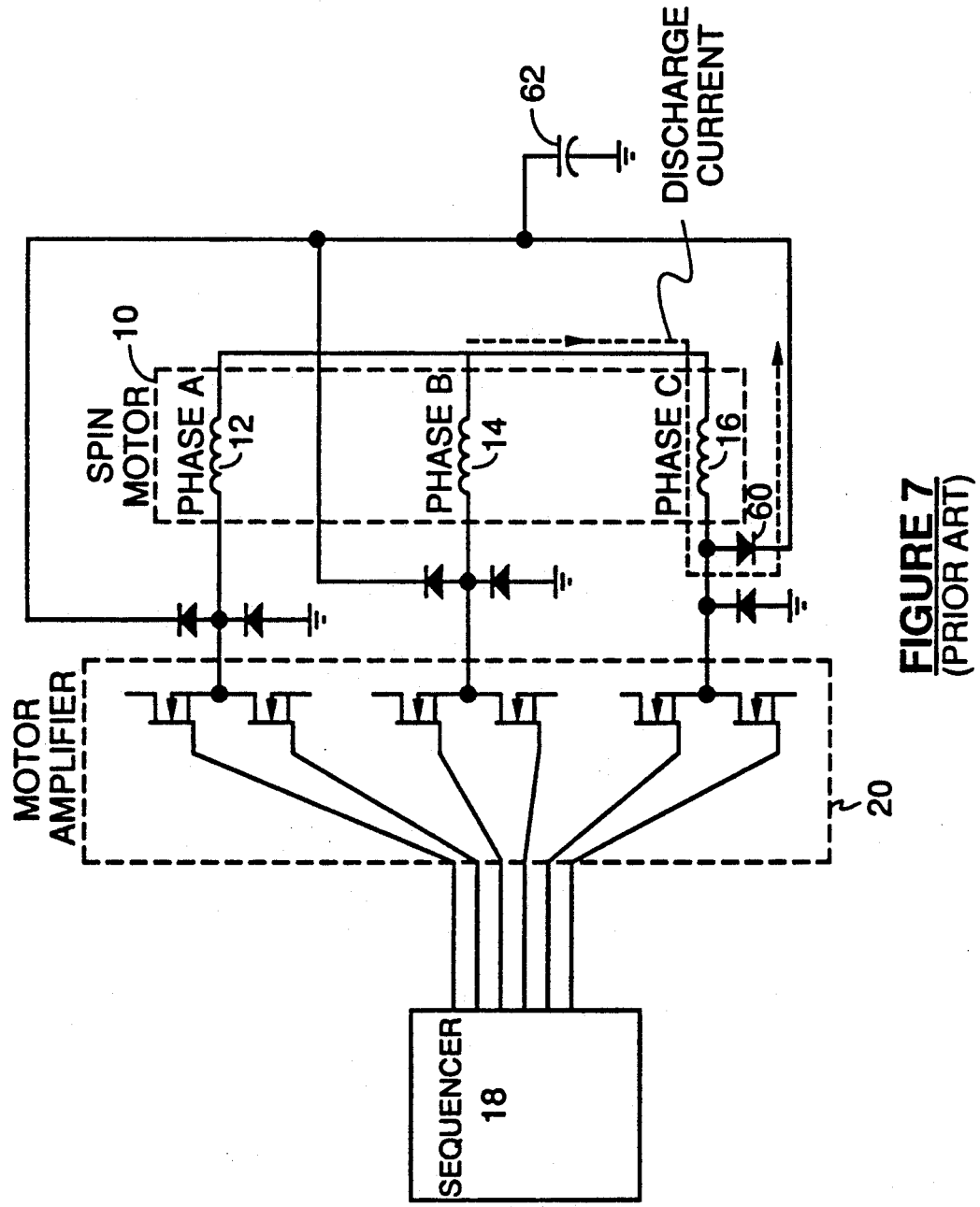
FIG. 7 is a schematic diagram illustrating residual current discharge in the phase C winding.
Figure 8A:
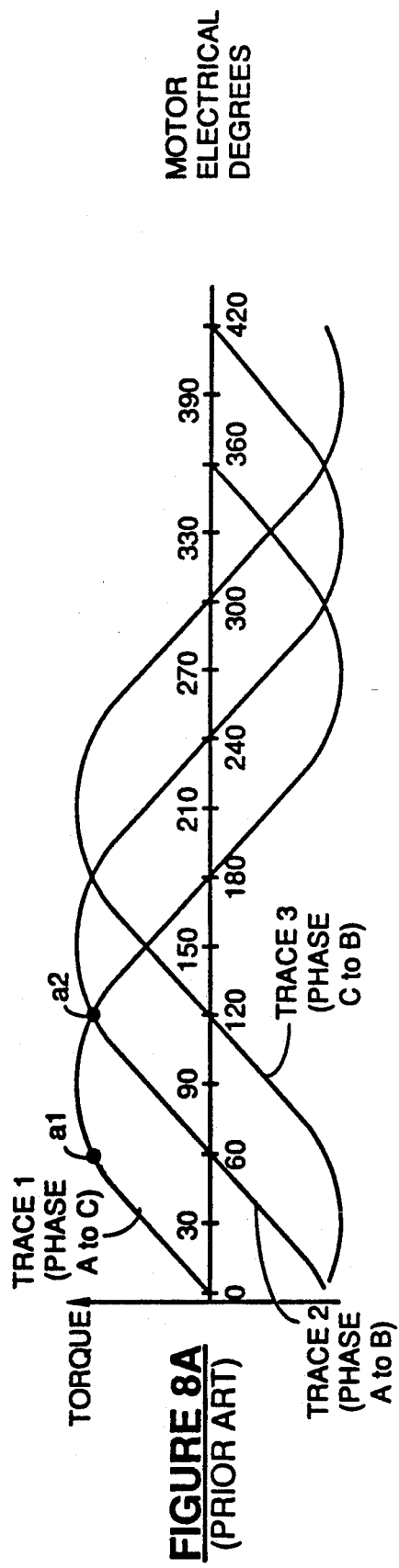
FIG. 8A is a set of traces illustrating motor torque with respect to motor electrical degrees.
Figure 8B:
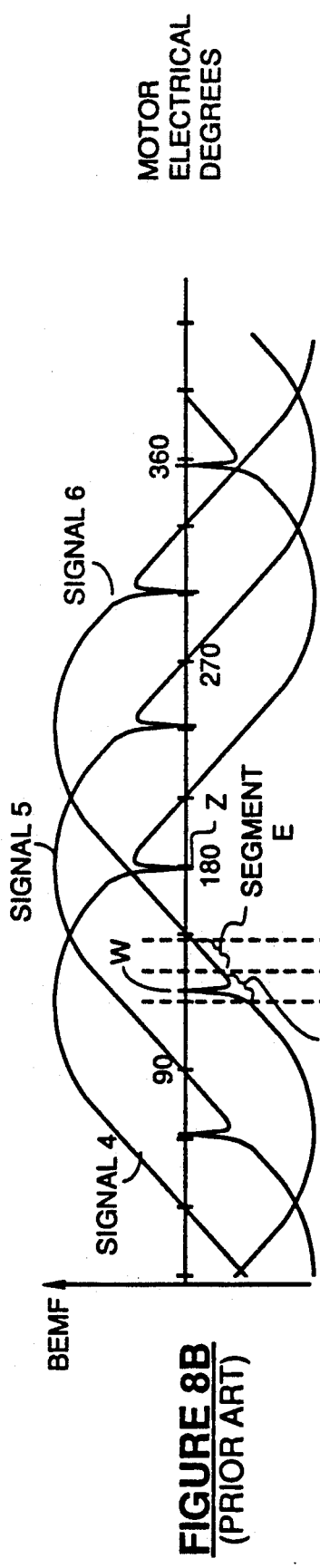
FIG. 8B is a set of waveforms illustrating the BEMF signals that have discharge current glitches generated in each phase winding of the spin motor.
Figure 8C:
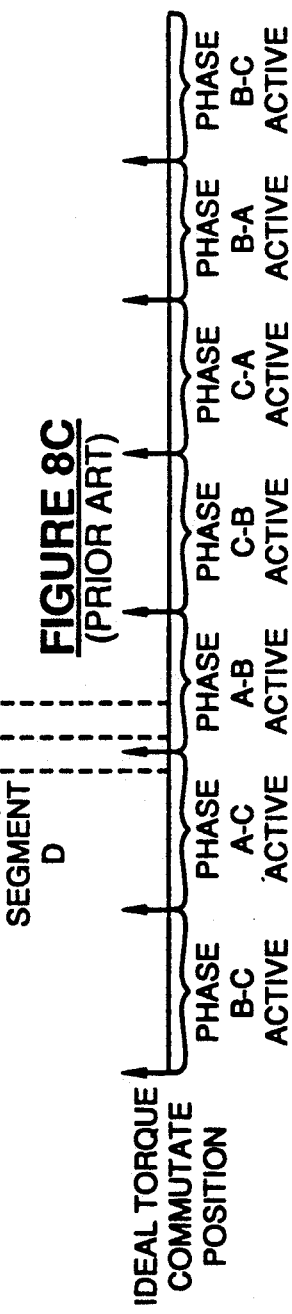
FIGS. 8C and 9A are timing diagrams illustrating ideal commutation times.
Figures 9A, 9B, 9C, 9D:
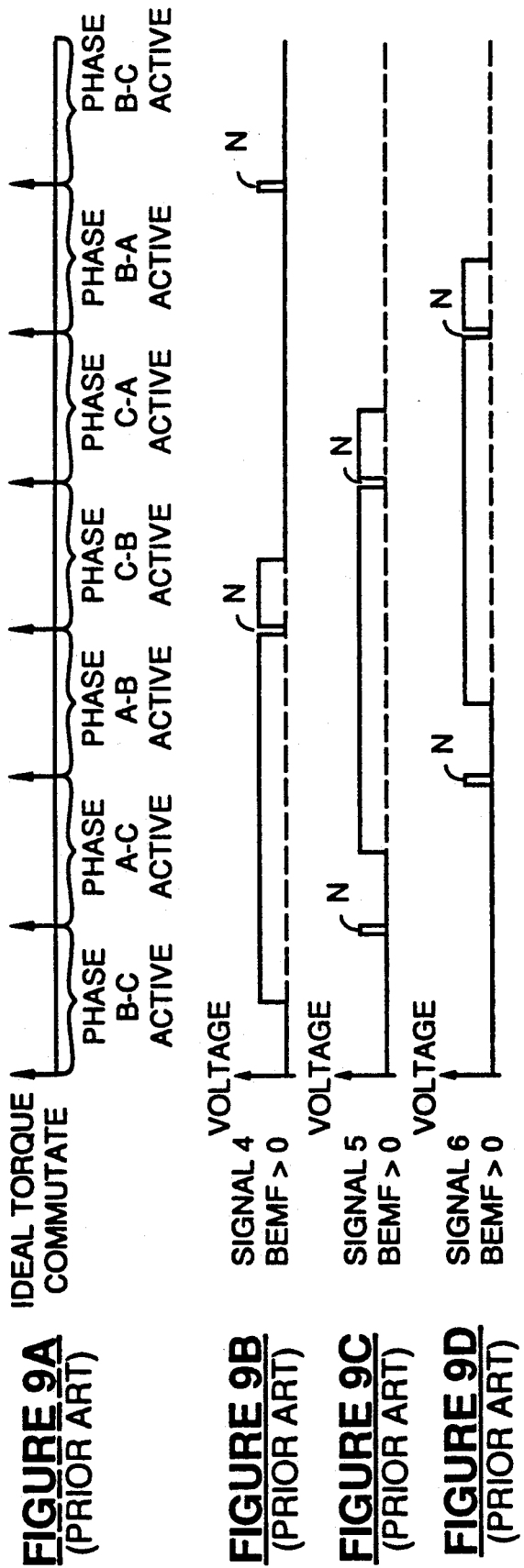
FIGS. 9B-9D are a set of waveforms illustrating the effect of glitches on the BEMF comparator output signals.
Figure 10:
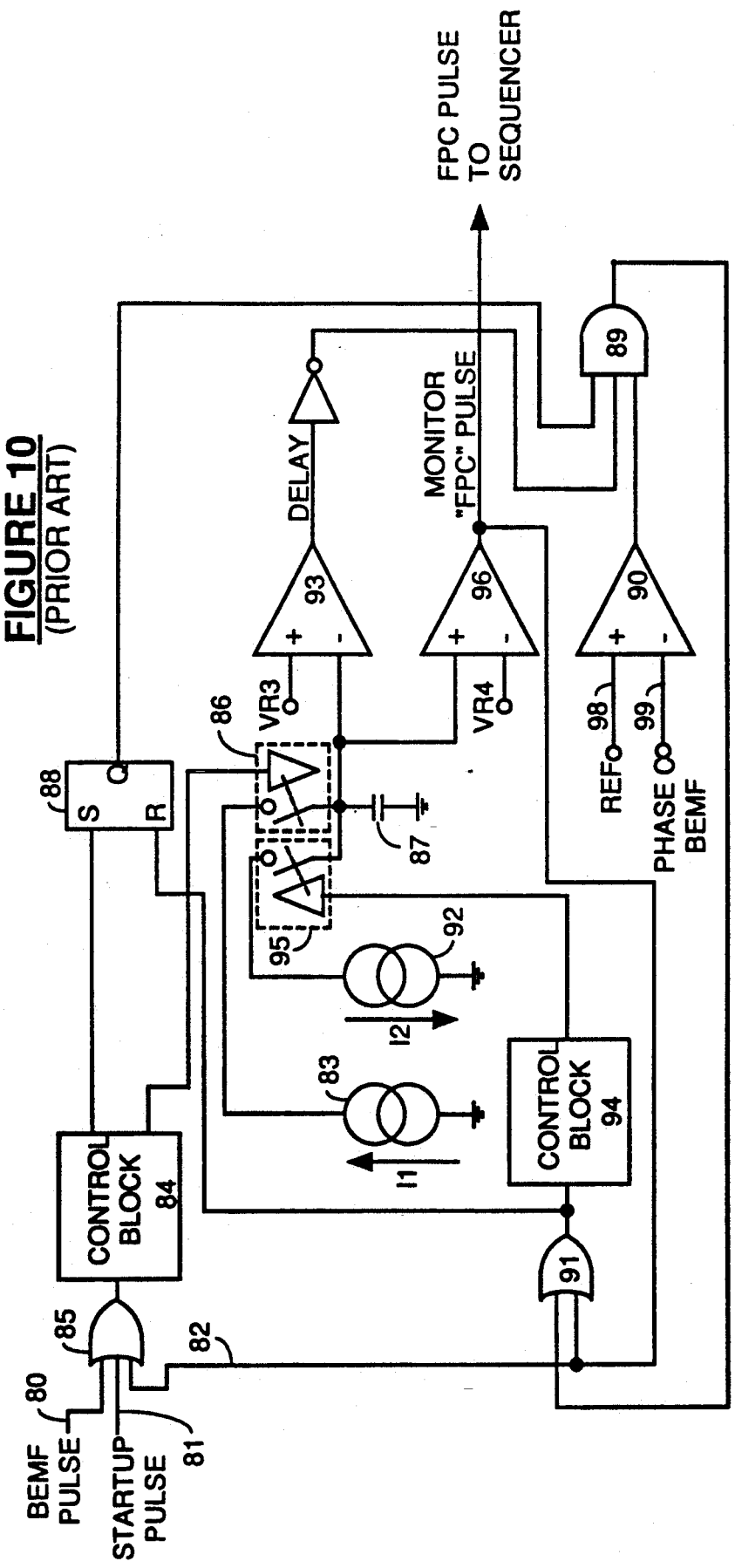
FIG. 10 is a block diagram of a monitor circuit.
Figure 11:
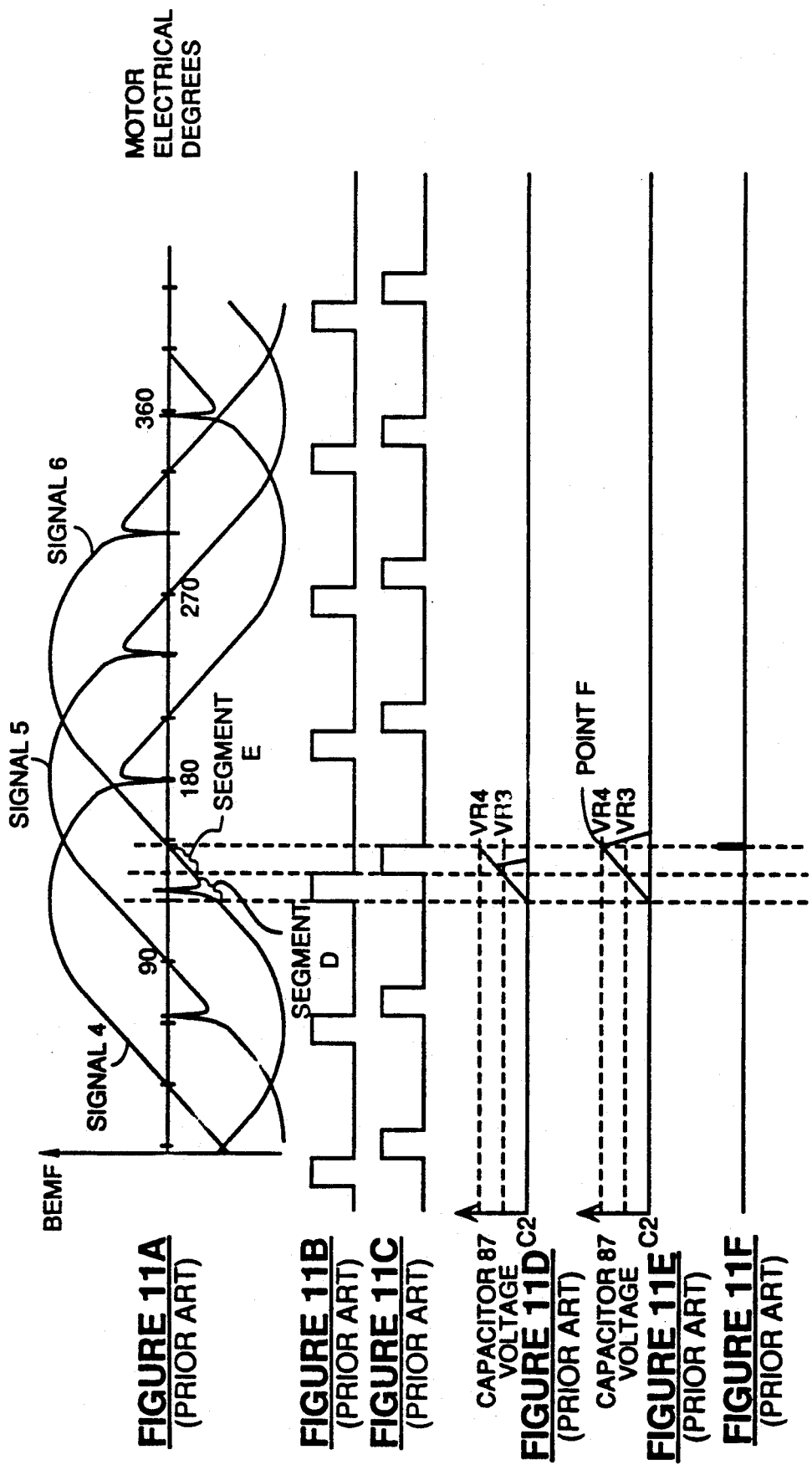
FIGS. 11A-11F are a set of waveforms associated with the monitor circuit.
Figure 12:
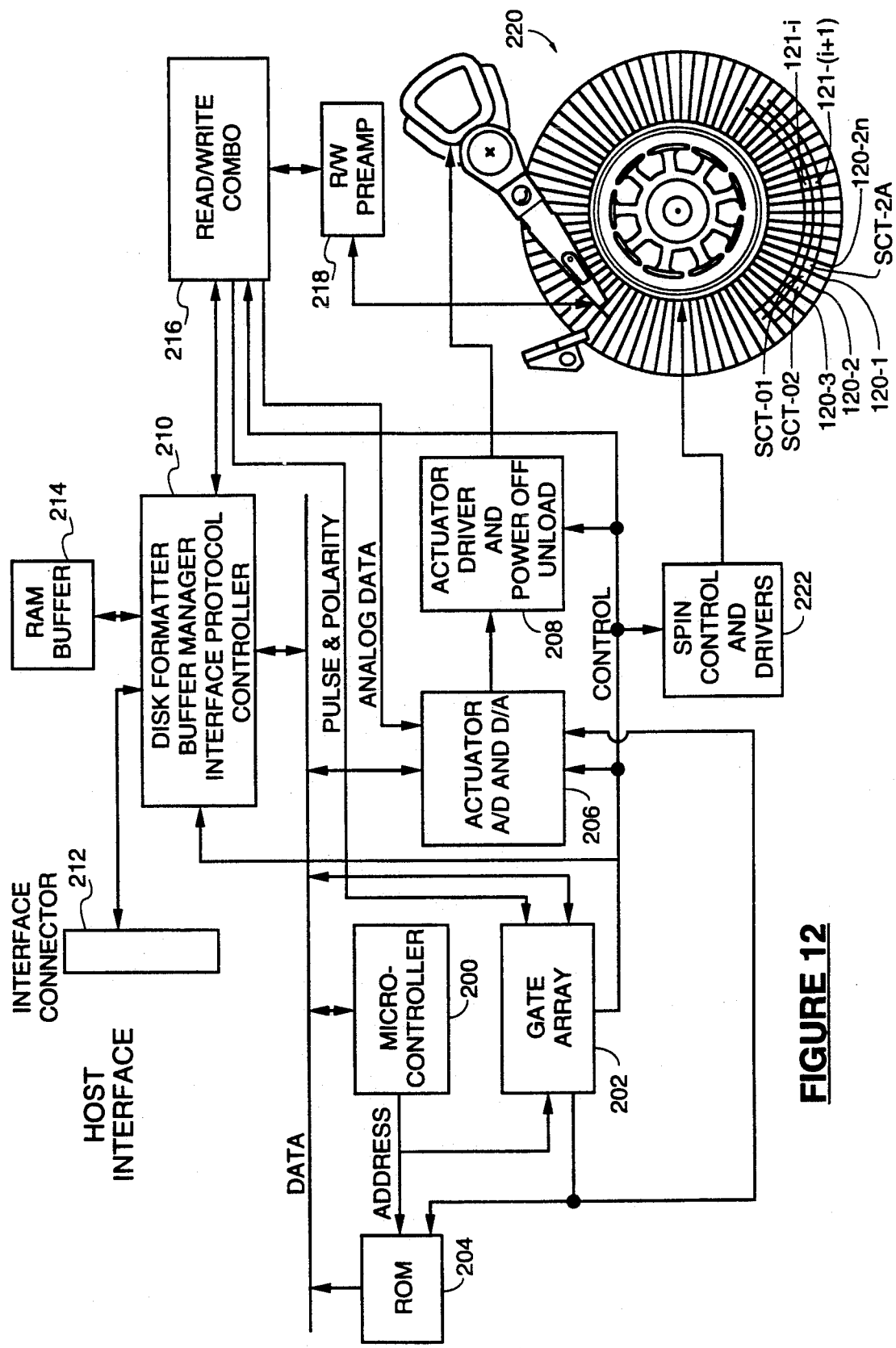
FIG. 12 is a block diagram of a hard disk drive system.

Referring first to FIG. 12, a block diagram of a hard disk drive system is shown to which the present invention is adapted. The block diagram includes a microcontroller 200, a gate array 202, a ROM block 204, an actuator 206, an actuator driver block 208, and a formatter/controller block 210. The diagram further includes an interface connector 212, a RAM buffer 214, a read/write combo block 216, a R/W preamp 218, a motor and transducer assembly 220, and a spin control and drivers block 222. The components and operation of the hard disk drive system shown are more completely described in the co-pending and commonly assigned U.S. patent application No. 07/629,948 of Morehouse et al., filed on Dec. 19, 1990 and entitled "Miniature Hard Disk Drive for Portable Computers", which is incorporated herein by reference in its entirety.

Figure 13:
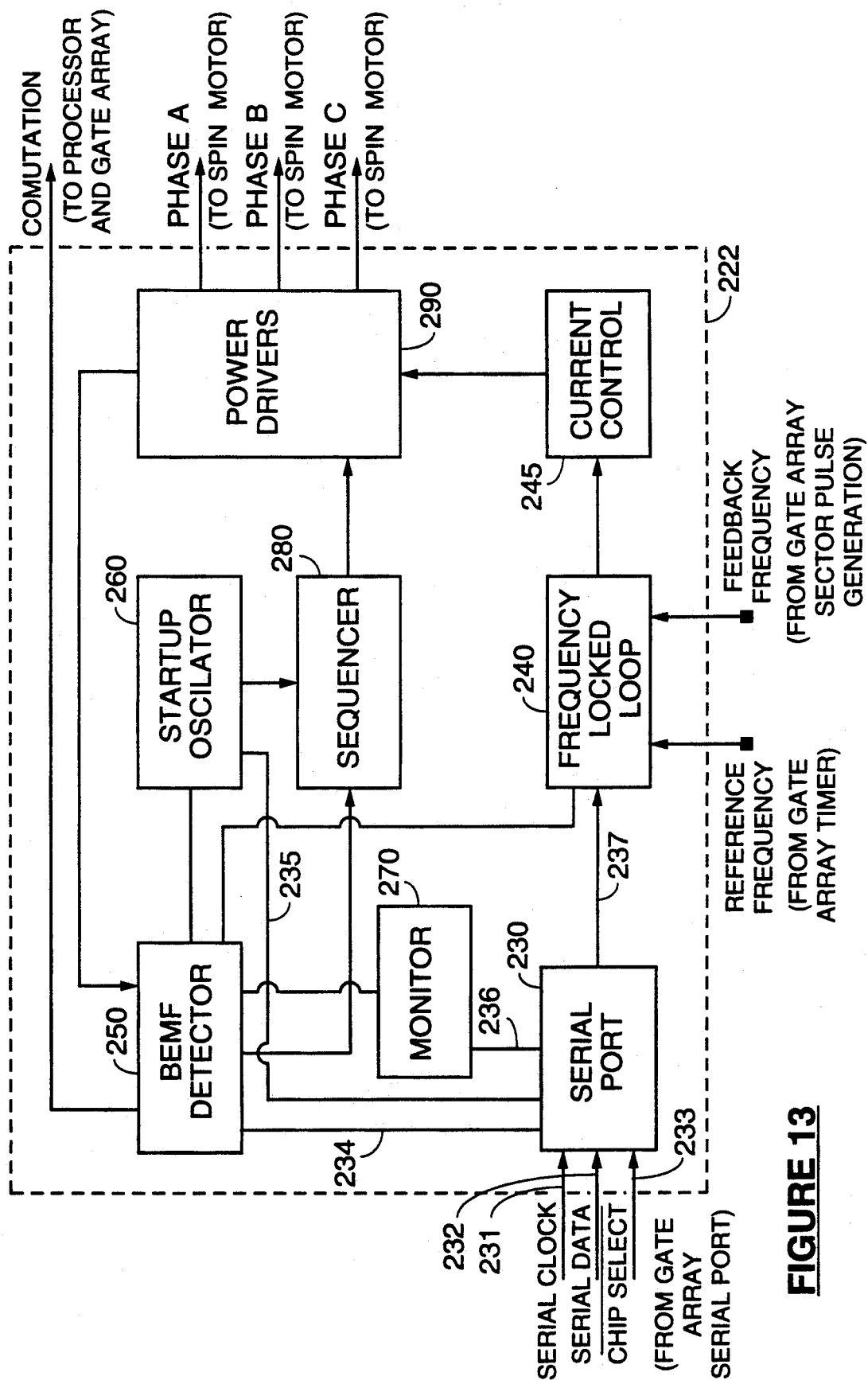
FIG. 13 is a block diagram of a spin control and drive portion of the disk drive system.

Referring next to FIG. 13, a block diagram is shown of the spin control and drivers block 222. The diagram includes a serial port 230, a frequency locked loop circuit 240, a current control circuit 245, a BEMF detector 250, a startup oscillator 260, a monitor circuit 270, a sequencer 280, and a power drivers block 290.

Serial port 230 receives serial clock signals, serial data signals, and chip select signals at input lines 231-233, respectively. Serial port 230 is coupled to BEMF detector 250 through a signal bus 234, to startup oscillator 260 through a signal bus 235, to monitor circuit 270 through a signal bus 236, and to frequency locked loop circuit 240 through a signal bus 237. Serial port 230 accommodates for the programming of components within frequency locked loop circuit 240, BEMF detector 250, startup oscillator 260, and monitor 270, as will become more evident below.

Frequency locked loop circuit 270 is provided to control the speed of the spin motor, and includes an input line for receiving a feedback frequency signal from gate array 202, and an input line for receiving a feedback frequency signal from BEMF detector 250. A third input line is further provided for receiving a reference frequency signal from an internal timer of gate array 202. Frequency locked loop circuit 240 includes an internal counter that is driven by the reference frequency signal. The counter value is compared to one of the feedback signals (from either gate array 202 or BEMF detector 250) to thereby provide an output signal to current control block 245 for precisely controlling the current supplied to the spin motor.

Figure 14:
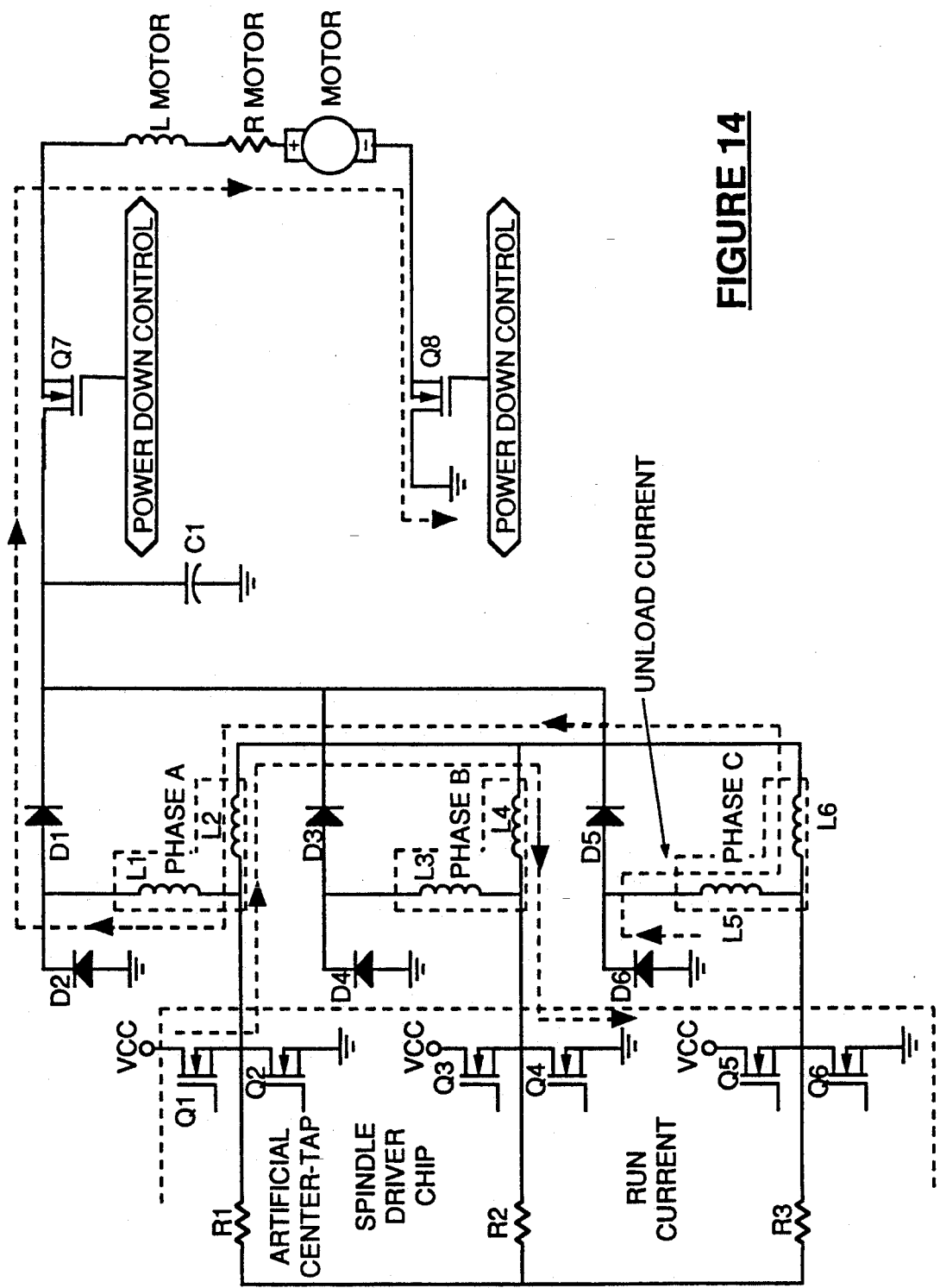
FIG. 14 is a schematic diagram of a commutation circuit for a spin motor.

FIG. 14 shows a schematic diagram of a portion of the power drivers block 290. The circuit of FIG. 14 is described more completely in co-pending and commonly assigned U.S. patent application No. 07/630,110 of Morehouse et al. filed on Dec. 19, 1990 and entitled "Spin Motor For a Hard Disk Assembly", which is incorporated herein by reference in its entirety. As it pertains to the present invention, it is important to note that a BEMF voltage is generated across each motor phase, and that this BEMF voltage is processed to generate a tachometer signal as described earlier. The capacitor C1 voltage that is generated by the BEMF voltage of L1-L6 is also used to unload the transducer heads as described in the co-pending applications. To generate the tachometer signal, only the portions L2, L4 and L6 of the motor are used.

Referring next to FIG. 15, a block diagram of a BEMF commutation circuit primarily within the BEMF detector 250 is shown. The components of the BEMF commutation circuit include a microprocessor interface 100, two up/down counters 102, 104, control logic circuits 106, 107, 108, 114, and frequency sources 112 and 113 for supplying signal sources (F1 and F2). The circuit further includes zero detectors 109, 110, AND gates 122, 123, OR gates 124, 128, and inverter gates 131, 132.

During operation, comparator and decoding circuitry as described previously is used to generate the tachometer signal of FIG. 3E. The tachometer signal is provided to line 135 and is thereby received by the up/down control pin of counter 102, by logic circuit 114, and by gates 122, 131 and 132.

When the motor is running at nominal speed, counter 102 counts up when the tachometer signal is in a high state. Signal F1 from frequency source 112 is used to clock counter 102. When the tachometer signal changes to a low state, the counter clock changes to signal F2 from frequency source 113 by way of logic circuit 106 and gates 122, 123, 124 and 131. Frequency source 113 generates a signal F2 that is twice the frequency of signal F1. In addition, counter 102 is controlled by the tachometer signal at the U/D terminal to count down. Referring to FIGS. 16A and 16B, when counter 102 reaches a count value of zero as detected by zero detector 110, the tachometer signal is at point Y, which is the optimal time at which to commutate the motor. Logic circuit 114 holds the counter 102 in a reset state until the tachometer signal goes to a high state. Logic circuit 114 also generates a BEMF commutation pulse when counter 102 reaches a count value of zero. This commutaton pulse is provided to motor sequencer 280 (FIG. 13) through OR gate 128 (FIG. 15).

While counter 102 is counting down, counter 104 is counting up with signal F1 as its clock source. The clock to counter 104 is disabled by logic circuit 107 when counter 102 reaches a count value of zero. When the tachometer signal changes to a high state, counter 104 is controlled at the U/D terminal to count down (with signal F1 as the source). When a count value of zero is reached, the tachometer signal is at point X which is also the optimal time at which to commutate the motor. Accordingly, logic circuit 108 issues a BEMF pulse on line 126 which is coupled to the motor sequencer through OR gate 128.

The operation of the BEMF commutation circuit also accommodates for the commutation of the motor during initial spinup. When the motor is first turning at startup, the period of the tachometer signal is much longer and counters 102, 104 count to a larger value. Since a much larger count value is reached in each counter, it also takes the respective counters much longer to count down to zero. Thus, the circuit is self-adjusting correcting and commutates the motor at the optimal time regardless of the period of the tachometer signal.

A potential problem could exist, however, if the motor is running extremely slow. For such a case, the tachometer period is very long and counters 102, 104 may not be sufficiently large to avoid an overflow condition. This would cause the respective counter 102, 104 to have a much lower value when the tachometer signal changed state. The wrong count value would then cause the motor to be commutated at the wrong time.

The circuit in accordance with the present invention can avoid this problem in one of several ways. The circuit can be designed by making counters 102, 104 large enough so that overflow conditions can never occur. Alternatively, the frequency of signal F1 and of signal F2 can be programmed to a lower frequency during startup so that the counters do not count up/down so quickly and thus not overflow. This can be achieved by providing programmable frequency sources 112 and 113 that are controllable by the microprocessor.

There are several other advantages provided by the above-described commutation control circuit as shown in FIG. 15. By using frequency sources and/or counters that are programmable, motors with widely varying parameters can be used without physically changing components such as capacitors. Operating parameters of the spin motor can thus be changed at the command of the microprocessor, and therefore, if a system parameter is changed such as substituting disk drives, the microprocessor can automatically change the operating parameters of the spin motor.

In addition, the requirement for external capacitors is eliminated. Thus, the entire control circuit can be fabricated on a single integrated circuit chip to thereby minimize space requirements.

Furthermore, the control circuit is insensitive to leakage currents and critical timing is not effected by temperature, humidity, and other environmental effects.

Finally, the critical timing is essentially identical from one spindle driver chip to the next, and does not depend upon identical matching of analog current sinks and sources.

Figure 17:
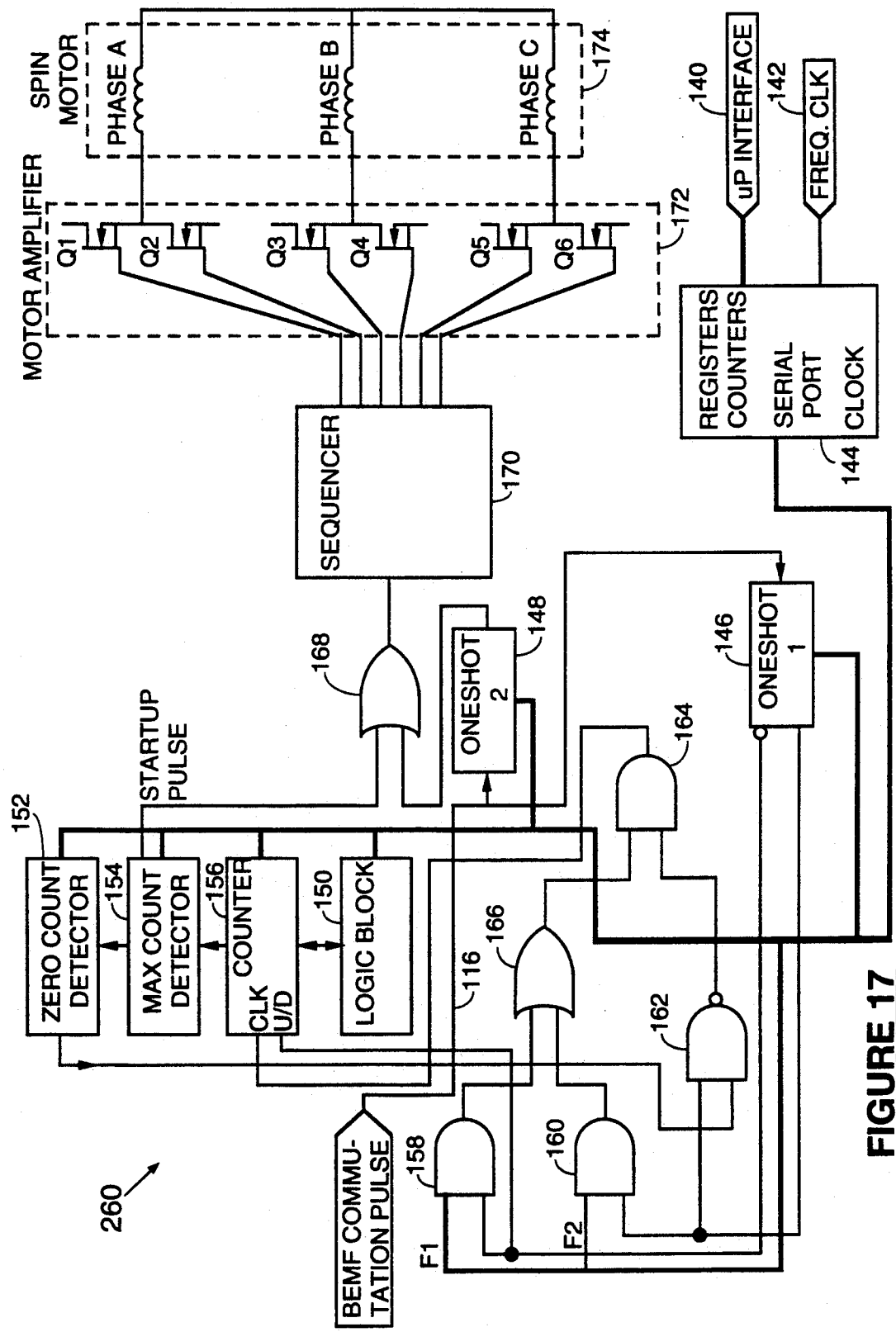
FIG. 17 is a block diagram of a startup circuit in accordance with the invention.

Referring next to FIG. 17, a block diagram is shown of a startup oscillator circuit 260 that allows the spin motor to be spunup from a stalled condition. When the BEMF signal generated by the motor is of sufficient amplitude, the startup-pulse generating circuitry is disabled. When disabled, the BEMF signal received at line 116 (from line 130 of FIG. 15) is used to commutate the motor amplifier.

The circuit includes a microprocessor interface 140, a frequency clock 142, a registers and counter block 144, oneshot circuits 146, 148, and logic block 150. The circuit further includes a zero count detector 152, a maximum count detector 154, a counter 156, AND gates 158, 160, 162, 164, and OR gates 166, 168. The circuit finally includes a sequencer 170, a motor amplifier 172, and a spin motor 174.

The sequencer 170, motor amplifier 172, and spin motor 174 operate in accordance with the above related description. Therefore, the specifics of their operation are not explained again below.

FIGS. 18A-18J show waveforms and signals associated with the startup oscillator. FIG. 18A represents the count value of counter 156 with respect to motor electrical degrees. FIG. 18B shows the generated startup pulses from maximum count detector 154 and FIG. 18C shows BEMF commutation pulses received at line 116. FIGS. 18D and 18E show output signals from AND gates 158 and 160, respectively, and FIG. 18F shows the control signal applied to the U/D terminal of counter 156. FIG. 18G shows the occurrence of a zero value detected by zero count detector 152, and FIG. 18H shows the occurrence of a maximum value detected by maximum count detector 154. Finally, FIGS. 18I and 18J show output signals from gates 164 and 162, respectively.

At initial operation of the disk drive unit, the spin motor is stationary. It is assumed herein that the desired direction of rotation of the spin motor is clockwise. The microprocessor, through the interface 140, programs the frequency of signals F1 and F2 provided from block 144. In addition, the microprocessor further initializes counter 156 to zero, sets the oneshot pulse duration times, and sets the count value in the maximum count detector 154. Signal F1 is gated through gates 158, 164, 166 to the clock input of counter 156. Accordingly, counter 156 starts to count up as shown in FIG. 18A. Counter 156 increases in value until it reaches the maximum count value, which is represented as point B. At this time, the maximum count detector 154 generates a startup pulse to sequencer 170 through OR gate 168 to commutate amplifier 172. The resulting startup pulse is shown in FIG. 18B. The motor accordingly switches to the next phase and logic block 150 simultaneously resets counter 156 to zero. This sequence continues in the absence of any BEMF generated commutation pulses.

The time period represented from point A to point C is set in accordance with the motor parameters to cause the motor to rotate to the next commutation point with each startup oscillator pulse. It should be noted that the oscillations due to the motor movements should be allowed to settle down before the next startup pulse is delivered. In addition, the proper setting of the time period A-C is important since if the pulse arrives too soon, the motor may rotate counter-clockwise, whereas if the pulse arrives too late, the motor may not rotate fast enough to generate a BEMF signal.

When point F is reached, the motor is rotating sufficiently fast that a BEMF commutation pulse is generated as shown in FIG. 18C. This pulse is received by oneshot circuit 148 that accordingly steps the sequencer to commutate the motor and amplifier. In addition, oneshot circuit 146 is also triggered. When oneshot circuit 146 is triggered, counter 156 counts down and signal F2 becomes the counter clock. Counter 156 counts down for the duration of the time programmed in for oneshot circuit 146. This time is shown as the period from point F to point G. After oneshot circuit 146 times out, counter 156 continues to count up toward point H. Normal operation continues until point J is reached. At this time another BEMF pulse is generated and counter 156 is again controlled to count down. However, during this time, more BEMF pulses are provided from the circuit of FIG. 15, thus preventing counter 156 from reaching the maximum count value. Eventually, counter 156 is driven to a count of zero. By this time, BEMF pulses are generated fast enough such that oneshot circuit 146 is continuously triggered. Since the counter 156 value is zero, no startup pulses are generated. Thus the startup circuitry is disabled and the motor 174 and amplifier 172 are commutated entirely by the BEMF pulses.

As a result of the startup oscillation circuit described above in accordance with the invention, the frequency of the spinup pulses is programmable to accommodate motors with varying parameters and changing environmental conditions. Furthermore, the entire circuit can be fabricated on a single integrated circuit chip since no external capacitor is required. Thus, space requirements are minimized. Finally, variations in the spinup pulses due to capacitance instability and board leakage are eliminated.

A monitor circuit for blanking out the BEMF commutation circuitry and for detecting proper spin direction is finally considered. Referring to the schematic diagram of FIG. 19, a monitor circuit is shown in accordance with a further aspect of the invention. The monitor circuit includes counters 180, 182, decode logic circuits 184, 186, and a microprocessor interface 120 that allows the counters 180, 182 and decode logic circuits 184, 186 to be programmed differently as conditions or parameters are changed. The monitor circuit further includes a comparator 190 for testing the polarity of the BEMF signal, a flip-flop 192, AND gates 194, 196, 198, OR gates 200, 202, and inverter gates 204, 206.

Referring to FIGS. 20A-20K in conjunction with the circuit schematic, initially the microprocessor programs the count length of counter 180 and the decode value of decode logic 184 for providing an output signal at the terminal count 1 (TC1) line. This sets the delay period time during which the pulse shown in FIG. 20D is asserted. During this time period, the BEMF comparators are degated so that the noise glitches will not affect their output signals. Counter 182 and the decode value for decode logic 186 for providing an output signal at the terminal count 2 (TC2) line are programmed to set the duration of time as shown in FIG. 20E during which the polarity of the BEMF signal is checked after the delay period.

The circuit is activated through OR gate 200 when either a BEMF commutation pulse, a startup oscillator pulse, or a TC2 pulse toggles flip-flop 192 to a high state. The output signal from flip-flop 192 is shown in FIG. 20B. When the output signal of flip-flop 192 goes high, AND gate 194 then generates a clock signal as shown in FIG. 20H to counter 180 and the counter 180 begins counting up as shown in FIG. 20C. When the terminal count 1 (TC1) value is reached AND gate 194 is disabled and AND gates 196 and 198 are enabled. Thus, counter 182 starts to count up as shown in FIG. 20F in accordance with the clock signal from the output line of AND gate 196.

If the motor is not spinning in the correct direction, the BEMF signal from Phase C will be positive and thus the output signal of comparator 190 will be low, thus allowing counter 182 to reach the terminal count 2 (TC2) value in accordance with the clock signal (AND gate 196 output signal) of FIG. 20I. When TC2 is reached, flip-flop 192 and counter 182 are reset and a pulse as shown in FIG. 20G is issued to the sequencer to advance the motor amplifier to the next phase. Since the terminal circuit 2 (TC2) signal is input to OR gate 200, the cycle is repeated.

If the BEMF signal is negative, the output signal of comparator 190 and AND gate 198 is high and thus counter 182 is reset by the output signal of OR gate 202. An example of the counter 182 value during this reset operation is illustrated in the waveform of FIG. 20J. Note that the clock signal from AND gate 196 as shown in FIG. 20K for this case has fewer repetitions. Since the motor is spinning in the correct direction, no pulse is issued to the sequencer by means of a TC2 pulse since the terminal count 2 value is not reached. The output signal from OR gate 202 causes flip-flop 192 to be reset and the circuit waits for the next pulse input to OR gate 200.

It is noted that only one comparator 190 is shown in the circuit of FIG. 19. Comparator 190 monitors the phase C voltage. Two other comparators are similarly connected in the circuit to monitor the voltage signals of phase A and B.

The monitor circuit described in accordance with the invention provides several advantages. Since a microprocessor interface and a serial port are provided, the operating parameters of the circuit can be programmably modified to accommodate changing motor parameters and environmental conditions. In addition, no external capacitor is required, thus minimizing space requirements. Finally, timing variations due to variances in capacitance values and due to board leakage currents are eliminated.

Numerous modifications and variations will become apparent to those skilled in the art once the above disclosure is fully appreciated. It is to be understood that the above detailed description of the preferred embodiment is intended to be merely illustrative of the spirit and scope of the invention and should not be taken in a limiting sense. The scope of the claimed invention is better defined with reference to the following claims.

We claim:

1. A startup control circuit for a spin motor comprising:
 a BEMF commutation pulse input line for receiving a BEMF commutation pulse from a BEMF commutation circuit;
 counter circuit means having an input line, a count direction control terminal, and an output line;
 wherein said counter circuit means changes a count value in response to a signal on said input line;
 a startup pulse is generated on said output line upon said count value equaling a predetermined value; and
 a signal on said direction control terminal determines the direction of change of said count value; and
 logic circuit means having (i) an input line coupled to said BEMF commutation pulse input line, (ii) an output line connected to said input line of said counter circuit means;

counter direction control circuit having an input line connected to said BEMF commutation pulse input line and an output line connected to said count direction control terminal of said counter circuit means wherein upon start up of said spin motor, said counter direction control circuit generates a signal having a first level on said output line;

wherein upon startup of said spin motor, said count value of said counter circuit means changes value in a first direction in response to each clock pulse generated on said output line by said logic circuit; and in response to said BEMF commutation pulse, said counter direction control circuit generates a signal providing a second level to said count direction control terminal of said counter circuit means so that said count value changes in a second direction different from said first direction thereby providing a smooth transition from a startup mode to a BEMF commutation mode of said spin motor.

2. The startup control circuit as recited in claim 1 wherein said signal on said input line of said counter circuit means is programmable in frequency.

3. The startup control circuit as recited in claim 1 wherein said counter circuit means further comprises:
a count value bus wherein said count value bus carries a signal representing said count value; and
a count detector connected to said count value bus and to said counter circuit output line wherein said count detector generates said startup pulse upon detection of a selected count value.

4. The startup control circuit as recited in claim 3 wherein said selected count value of said count detector is programmable.

5. The startup control circuit as recited in claim 2 further comprising a microprocessor interface coupled to said counter circuit means.

6. The startup control circuit as recited in claim 4 further comprising a microprocessor interface coupled to said counter circuit means.

7. The startup control circuit as recited in claim 1, said counter circuit means further comprising:
a count value bus wherein said count value bus carries a signal representing said count value; and
a count detector having an input line connected to said count value bus and an output line connected to said logic circuit
wherein said count detector generates a signal on said output line upon detection of a selected count value; and
said logic circuit, in response to said count detector output signal, inhibits generation of signals on said output line of said logic circuit.

8. The startup control circuit as recited in claim 7 further comprising sequencer circuit means having an input line coupled to said counter circuit output line wherein said sequencer circuit commutates a phase of said spin motor in response to said start-up pulse from counter circuit means.

9. The startup control circuit as recited in claim 8 further comprising a first pulse generator circuit having (i) in input line connected to said BEMF commutation pulse input line and (ii) an output line coupled to said sequencer circuit wherein in response to said BEMF commutation pulse, said first pulse generator circuit generates a pulse on said output line.

10. The startup control circuit as recited in claim 9 wherein said counter direction control circuit comprises a second pulse generator circuit having (i) an input line connected to said BEMF commutation pulse input line and (ii) an output line connected to said count direction control terminal of said counter circuit means wherein said input line and output line of said second pulse generator are said input line and output line, respectively, of said counter direction control circuit.

11. The startup control circuit as recited in claim 1 wherein a count module of said counter circuit means is programmable.

12. The startup control circuit as recited in claim 11 further comprising a microprocessor interface coupled to said counter circuit means.

13. A circuit for blanking a BEMF commutation pulse for a permanent magnet direct current spin motor, said circuit comprising:
a sequencer circuit that commutates a phase of said spin motor;
first circuit means having:
a BEMF commutation pulse input line;
a clock input line;
first counter circuit means having (i) an input line operatively coupled to said BEMF commutation pulse input line and to said clock input line, (ii) a first output line having a first signal level when said counter circuit means has a selected count value and a second signal level otherwise, (ii) a second output line having said second signal level when said counter circuit has said selected count value and a first signal level otherwise
wherein said first counter circuit means counts clock pulses on said clock input line upon said second output line having said first signal level and a BEMF commutation pulse is received on said BEMF commutation pulse input line;
second circuit means having:
an input line coupled to said first output line of said first circuit means;
a clock input line;
second counter circuit means having (i) an input line operatively coupled to said second circuit means input line and to said clock input line, and (ii) an output line connected to said sequencer circuit and having a first signal level when said second counter circuit means has a selected count value and a second signal level otherwise
wherein said second counter circuit means requires that said first output line of said first circuit means have said first signal level as one condition for counting clock pulses on said clock input line.

14. The circuit as recited in claim 13 further comprising a monitor circuit, operatively coupled to said second counter circuit means, for detecting a spin direction of said spin motor wherein upon said spin motor having a selected spin direction, a monitor circuit output signal resets said second counter circuit means.

15. The circuit as recited in claim 14 wherein said monitor circuit comprises a spin motor phase voltage comparator circuit coupled to receive a BEMF signal.

* * * * *